United States Patent
Yerramalli et al.

(10) Patent No.: US 12,262,360 B2
(45) Date of Patent: Mar. 25, 2025

(54) COMMUNICATING ACROSS A WIDEBAND USING SUB-BANDS

(71) Applicant: QUALCOMM Incorporated, San Diego, CA (US)

(72) Inventors: Srinivas Yerramalli, Hyderabad (IN); Arumugam Chendamarai Kannan, San Diego, CA (US); Vasanthan Raghavan, West Windsor Township, NJ (US); Jing Sun, San Diego, CA (US); Vinay Chande, San Diego, CA (US); Giovanni Chisci, San Diego, CA (US); Tao Luo, San Diego, CA (US); Wooseok Nam, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 324 days.

(21) Appl. No.: 17/375,905

(22) Filed: Jul. 14, 2021

(65) Prior Publication Data

US 2022/0030593 A1  Jan. 27, 2022

Related U.S. Application Data

(60) Provisional application No. 63/056,321, filed on Jul. 24, 2020.

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0048* (2013.01); *H04L 25/0202* (2013.01); *H04W 72/23* (2023.01); *H04W 72/51* (2023.01)

(58) Field of Classification Search
CPC ............. H04W 72/0453; H04W 72/23; H04W 72/51; H04L 5/0048; H04L 25/0202;
(Continued)

(56) References Cited

U.S. PATENT DOCUMENTS 10,554,262 B2   2/2020   John Wilson et al.
11,206,547 B1 * 12/2021   Rasool .................. H04L 5/0094
(Continued)

FOREIGN PATENT DOCUMENTS

WO   WO-2018209179        11/2018
WO   WO-2019196886 A1    10/2019

OTHER PUBLICATIONS

AT&T: "Design Considerations for NR Operation with Wide Bandwidths", 3GPP TSG RAN WG1 NR Ad-Hoc#2, 3GPP Draft, R1-1710416 ATT Wideband, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), 5 Pages, XP051299628, Retrieved from the Internet: URL: http://www.3gpp.org/ftp/Meetings_3GPP_SYNC/RAN1/Docs, [retrieved on Jun. 26, 2017], Title, Sections 2-4, Section 6.
(Continued)

*Primary Examiner* — Sun Jong Kim
(74) *Attorney, Agent, or Firm* — Holland & Hart LLP

(57) ABSTRACT

Methods, systems, and devices for wireless communications are described. To support communications across a wideband, a base station and user equipment (UE) may communicate across the wideband using a set of sub-bands that span the carrier bandwidth (e.g., the wideband). In some cases, the UE may transmit, to the base station, an indication of a capability of the UE to communicate a wideband communication with the base station via the set of sub-band based communications with the base station. The UE may receive,
(Continued)

from the base station (and, in some cases based on the capability of the UE), a configuration for communicating with the base station in the carrier bandwidth using the set of sub-bands. Then, the UE may communicate with the base station in the carrier bandwidth using one or more of the set of sub-bands in accordance with the configuration.

26 Claims, 17 Drawing Sheets

(51) Int. Cl.
*H04L 25/02* (2006.01)
*H04W 72/23* (2023.01)
*H04W 72/51* (2023.01)

(58) Field of Classification Search
CPC ............... H04L 5/0092; H04L 25/0204; H04L 25/0224; H04L 5/0007; H04B 7/0695; H04B 7/0691
See application file for complete search history.

(56) References Cited

U.S. PATENT DOCUMENTS

| | | | | |
|---|---|---|---|---|
| 2010/0150035 | A1* | 6/2010 | Tao | H04B 7/2606 370/280 |
| 2013/0028341 | A1* | 1/2013 | Ayach | H04B 7/0617 375/267 |
| 2016/0192351 | A1* | 6/2016 | Kwon | H04W 72/21 370/329 |
| 2018/0199343 | A1* | 7/2018 | Deogun | H04L 5/0044 |
| 2018/0254815 | A1* | 9/2018 | Liu | H04B 7/0626 |
| 2018/0278454 | A1* | 9/2018 | Islam | H04L 1/0038 |
| 2018/0287681 | A1* | 10/2018 | Chen | H04L 5/005 |
| 2020/0084787 | A1 | 3/2020 | Hao et al. | |
| 2021/0120446 | A1* | 4/2021 | Zhang | H04B 17/309 |
| 2021/0235495 | A1* | 7/2021 | Xu | H04W 72/0453 |
| 2022/0007325 | A1* | 1/2022 | Qi | G01S 5/0273 |
| 2022/0053349 | A1* | 2/2022 | Wu | H04W 24/08 |
| 2022/0104258 | A1* | 3/2022 | Moon | H04L 5/0092 |
| 2022/0109541 | A1* | 4/2022 | Cirik | H04L 5/0053 |
| 2022/0209833 | A1* | 6/2022 | Liu | H04L 1/0009 |
| 2022/0210802 | A1* | 6/2022 | Hwang | H04L 1/1614 |

OTHER PUBLICATIONS

International Search Report and Written Opinion—PCT/US2021/041776—ISA/EPO—dated Nov. 2, 2021 (206187WO).

* cited by examiner

COMMUNICATING ACROSS A WIDEBAND USING SUB-BANDS

CROSS REFERENCE

The present application for patent claims the benefit of U.S. Provisional Patent Application No. 63/056,321 by YERRAMALLI et al., entitled "COMMUNICATING ACROSS A WIDEBAND USING SUB-BANDS," filed Jul. 24, 2020, assigned to the assignee hereof, and expressly incorporated by reference herein.

FIELD OF TECHNOLOGY

The following relates to wireless communications, including communicating across a wideband using sub-bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications over a wideband carrier bandwidth. That is, some wireless communications systems may support communications using high transmission bandwidth-to-center frequency ratios (e.g., greater than five percent, ten percent, or some other threshold percentage). As a result, communication devices may operate using large carrier bandwidths. Additionally, these communication devices may support communications in a millimeter band (e.g., from 30 gigahertz (GHz) to 300 GHz). In some cases, wideband communications—in the millimeter band or other radio frequency spectrum bands—may suffer decreased reliability due to a change in an array response across a carrier bandwidth. For example, a wireless device may optimize wideband communications for a center frequency of the carrier bandwidth using a communication beam. However, signals transmitted at various frequencies across the carrier bandwidth (e.g., relatively far from the center frequency) may suffer performance degradation and decreased reliability due to the large carrier bandwidth and the communication beam operating differently at different frequencies.

SUMMARY

The described techniques relate to improved methods, systems, devices, and apparatuses that support communicating across a wideband using sub-bands. Generally, the described techniques relate to a set of sub-bands that span the wideband carrier bandwidth. For example, a user equipment (UE) may receive, from a base station, a configuration for communicating with the base station in the carrier bandwidth using the set of sub-bands. In some instances, the UE may transmit, to the base station, an indication of a capability of the UE to communicate wideband communications with the base station via the set of sub-bands. That is, the UE may be configured for communications over a first subset of the sub-bands that span the carrier bandwidth (e.g., optimized for communications over the subset of the sub-bands). Here, the receiving the configuration may be based on the UE transmitting the indication of the capability of the UE to communicate in the carrier bandwidth. In some cases, the base station may additionally be optimized for communications over a second subset of the sub-bands spanning the carrier bandwidth. Here, the configuration for communicating in the carrier bandwidth may be based on the first subset of sub-bands and the second subset of sub-bands. The UE and base station may then communicate in the carrier bandwidth using one or more of the set of sub-bands in accordance with the configuration.

A method of wireless communication at a UE is described. The method may include identifying a carrier bandwidth for communicating a wideband communication with a base station, receiving, from the base station, a configuration for communicating with the base station in the carrier bandwidth using a set of sub-band based communications that are over a set of sub-bands spanning the carrier bandwidth, and communicating with the base station in the carrier bandwidth using one or more of the set of sub-bands in accordance with the configuration.

An apparatus for wireless communication at a UE is described. The apparatus may include a processor, memory coupled with the processor, and instructions stored in the memory. The instructions may be executable by the processor to cause the apparatus to identify a carrier bandwidth for communicating a wideband communication with a base station, receive, from the base station, a configuration for communicating with the base station in the carrier bandwidth using a set of sub-band based communications that are over a set of sub-bands spanning the carrier bandwidth, and communicate with the base station in the carrier bandwidth using one or more of the set of sub-bands in accordance with the configuration.

Another apparatus for wireless communication at a UE is described. The apparatus may include means for identifying a carrier bandwidth for communicating a wideband communication with a base station, receiving, from the base station, a configuration for communicating with the base station in the carrier bandwidth using a set of sub-band based communications that are over a set of sub-bands spanning the carrier bandwidth, and communicating with the base station in the carrier bandwidth using one or more of the set of sub-bands in accordance with the configuration.

A non-transitory computer-readable medium storing code for wireless communication at a UE is described. The code may include instructions executable by a processor to identify a carrier bandwidth for communicating a wideband communication with a base station, receive, from the base station, a configuration for communicating with the base station in the carrier bandwidth using a set of sub-band based communications that are over a set of sub-bands spanning the carrier bandwidth, and communicate with the base station in the carrier bandwidth using one or more of the set of sub-bands in accordance with the configuration.

A method of wireless communications at a base station is described. The method may include identifying a carrier bandwidth for communicating a wideband communication with a UE, transmitting, to the UE, a configuration for communicating with the base station in the carrier bandwidth using a set of sub-band based communications that are over a set of sub-bands spanning the carrier bandwidth, and communicating with the UE in the carrier bandwidth using one or more of the set of sub-bands in accordance with the configuration.

An apparatus for wireless communications at a base station is described. The apparatus may include a processor, memory coupled with the processor, and instructions stored in the memory. The instructions may be executable by the processor to cause the apparatus to identify a carrier bandwidth for communicating a wideband communication with a UE, transmit, to the UE, a configuration for communicating with the base station in the carrier bandwidth using a set of sub-band based communications that are over a set of sub-bands spanning the carrier bandwidth, and communicate with the UE in the carrier bandwidth using one or more of the set of sub-bands in accordance with the configuration.

Another apparatus for wireless communications at a base station is described. The apparatus may include means for identifying a carrier bandwidth for communicating a wideband communication with a UE, transmitting, to the UE, a configuration for communicating with the base station in the carrier bandwidth using a set of sub-band based communications that are over a set of sub-bands spanning the carrier bandwidth, and communicating with the UE in the carrier bandwidth using one or more of the set of sub-bands in accordance with the configuration.

A non-transitory computer-readable medium storing code for wireless communications at a base station is described. The code may include instructions executable by a processor to identify a carrier bandwidth for communicating a wideband communication with a UE, transmit, to the UE, a configuration for communicating with the base station in the carrier bandwidth using a set of sub-band based communications that are over a set of sub-bands spanning the carrier bandwidth, and communicate with the UE in the carrier bandwidth using one or more of the set of sub-bands in accordance with the configuration.

DETAILED DESCRIPTION

Figure 1:
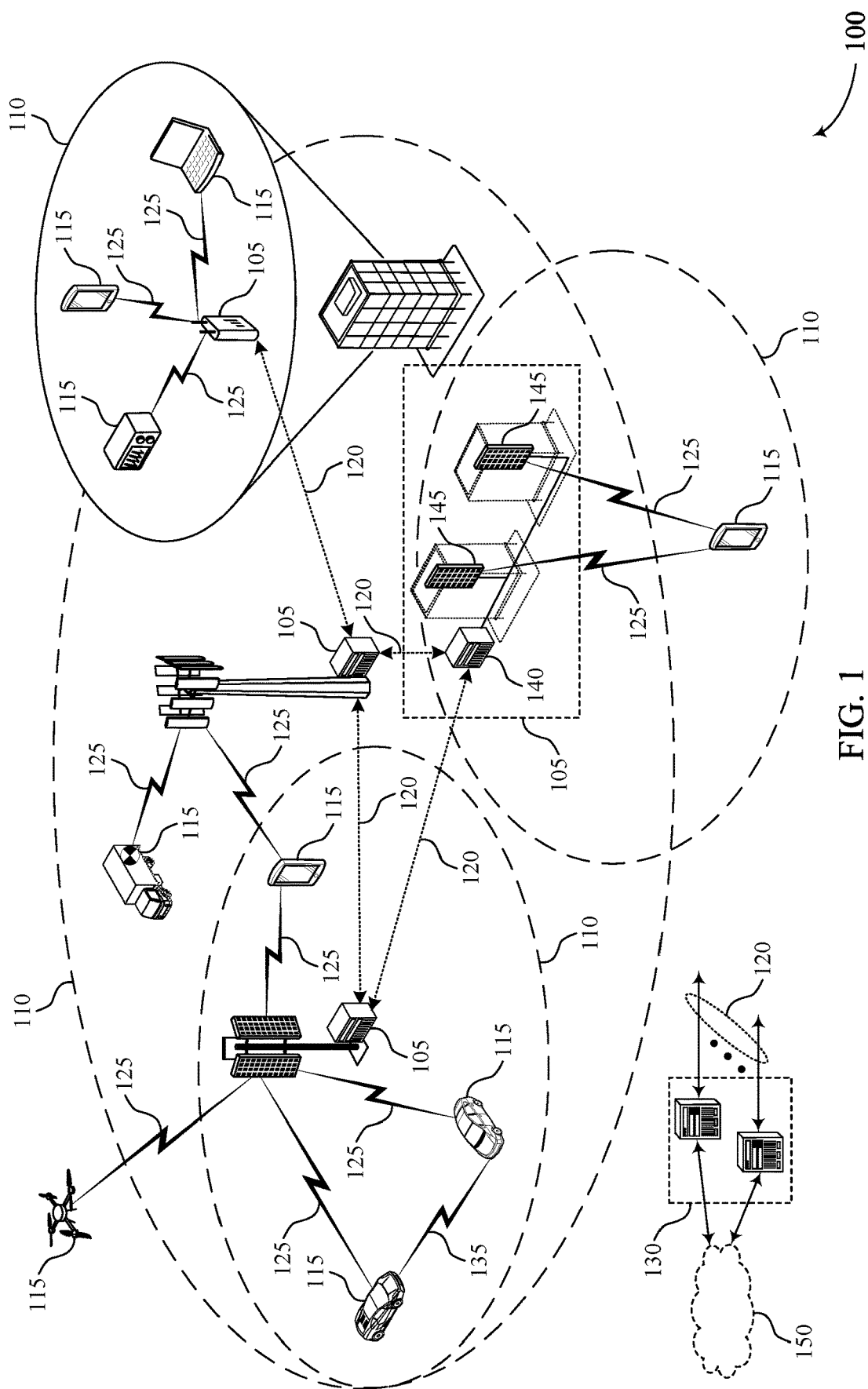
FIG. 1 illustrates an example of a system for wireless communications that supports communicating across a wideband using sub-bands in accordance with aspects of the present disclosure.

Some wireless communications systems may include communication devices, such as a UE and a base station (e.g., an eNodeB (eNB), a next-generation NodeB or a giga-NodeB, either of which may be referred to as a gNB, or some other base station), that may support multiple radio access technologies (RATs). Examples of RATs include 4G systems, such as LTE systems, and 5G systems, which may be referred to as NR systems. In some cases, the UE and the base station may support wideband carrier bandwidths. That is, the UE and the base station may communicate over one or more carriers having relatively high carrier bandwidth-to-center frequency ratios (e.g., greater than five percent, ten percent, or some other threshold percentage). Additionally, the UE may, in some examples, perform channel estimation on one or more physical channels to maintain a reliable and efficient communication link between the UE and the base station.

In some cases, a millimeter wave (mmW) system operating using large carrier bandwidths may experience a change in an array response across the carrier bandwidth. For example, a base station or a UE, or both, may optimize wideband communications using a communication beam for a center frequency of the carrier bandwidth. However, signals transmitted at various frequencies across the carrier bandwidth (e.g., relatively far from the center frequency) may potentially experience significant degradation due to the large carrier bandwidth and the communication beams operating differently at different frequencies. As a result, channel estimation performance by the UE for a wideband carrier may be less reliable (e.g., as compared to communications over a narrower carrier bandwidth) and the wireless communications system may suffer performance degradation.

To support reliable transmissions for wideband communications, the wide carrier bandwidth may include a set of sub-bands that span the carrier bandwidth. Thus, the UE and base station may communicate using one or more of the set of sub-bands, which may be associated with less performance degradation when compared to communications that span the entire carrier bandwidth. In some cases, the UE may transmit, to the base station, an indication of a capability of the UE to communicate wideband communications with the base station via the set of sub-bands. That is, the UE may be configured for communications over a first subset of the sub-bands that span the carrier bandwidth (e.g., optimized for communications over the subset of the sub-bands). In response, the base station may transmit a configuration for communicating with the UE in the carrier bandwidth using the set of sub-bands. In some cases, the base station may additionally be optimized for communications over a second subset of the sub-bands spanning the carrier bandwidth. Here, the configuration for communicating in the carrier bandwidth may be based on the first subset of sub-bands and the second subset of sub-bands. The UE and base station may then communicate in the carrier bandwidth using one or more of the set of sub-bands in accordance with the configuration.

Aspects of the disclosure are initially described in the context of wireless communications systems. Aspects of the disclosure are then described in the context of carrier schemes and a process flow. Aspects of the disclosure are further illustrated by and described with reference to apparatus diagrams, system diagrams, and flowcharts that relate to communicating across a wideband using sub-bands.

FIG. 1 illustrates an example of a wireless communications system 100 that supports communicating across a wideband using sub-bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support wideband array operations. That is, the wireless communications system 100 may support wideband communications between a base station 105 and a UE 115 using a high transmission bandwidth-to-center frequency ratio. In some cases, if the transmission bandwidth-to-center frequency ratio is greater than a threshold percentage (e.g., five percent, ten percent, or some other threshold percentage), the wireless communications system 100 may be considered a wideband system. In some such systems, the base station 105 and the UE 115 may communicate over one or more carriers with relatively large carrier bandwidths. In some cases, an array response of the base station 105, the UE 115, or both may change across the carrier bandwidth. For example, signals transmitted at various frequencies across the carrier bandwidth (e.g., relatively far from the center frequency) may suffer moderate to severe signal loss (e.g., SINR loss) or may be undetectable by the UE 115 due to the change in the array response across the bandwidth. The signal loss may potentially cause a decrease in transmission reliability and a loss in performance.

Various aspects of the described techniques support communications across a wideband using sub-bands. For example, the wide carrier bandwidth may include a set of sub-bands that span the carrier bandwidth. Thus, the UE 115 and base station 105 may communicate using one or more of the set of sub-bands, which may be associated with less performance degradation when compared to communications that span the entire carrier bandwidth. In some cases, the UE 115 may transmit, to the base station 105, an indication of a capability of the UE 115 to communicate wideband communications with the base station 105 via the set of sub-bands. That is, the UE 115 may be configured for communications over a first subset of the sub-bands that span the carrier bandwidth (e.g., optimized for communications over the subset of the sub-bands). In response, the base station 105 may transmit a configuration for communicating with the UE 115 in the carrier bandwidth using the set of sub-bands. In some cases, the base station 105 may additionally be optimized for communications over a second subset of the sub-bands spanning the carrier bandwidth. Here, the configuration for communicating in the carrier bandwidth may be based on the first subset of sub-bands and the second subset of sub-bands. The UE 115 and base station 105 may then communicate in the carrier bandwidth using one or more of the set of sub-bands in accordance with the configuration.

Figure 2:
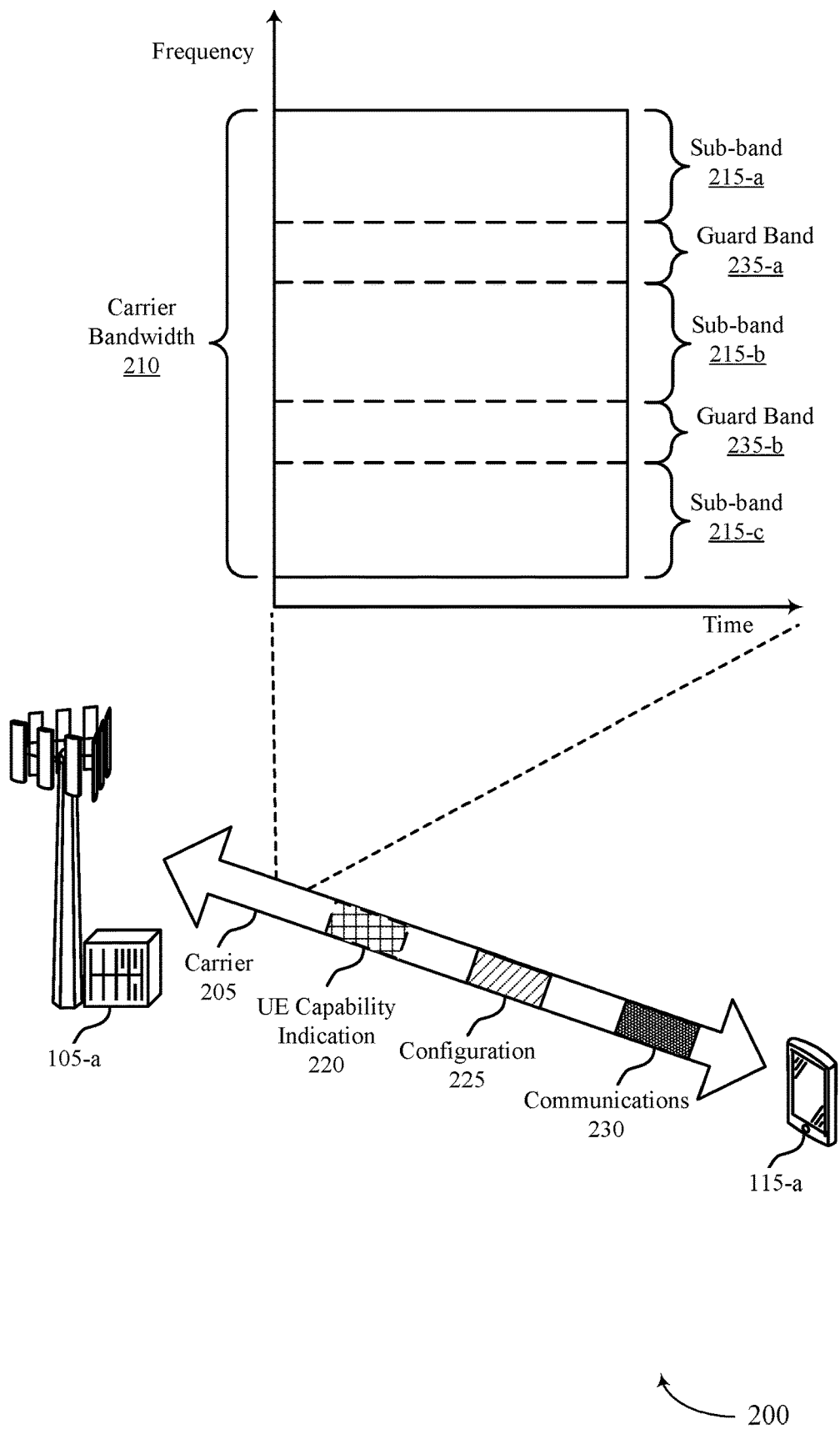
FIG. 2 illustrates an example of a system that supports communicating across a wideband using sub-bands in accordance with aspects of the present disclosure.

FIG. 2 illustrates an example of a wireless communications system 200 that supports communicating across a wideband using sub-bands in accordance with aspects of the present disclosure. In some examples, the wireless communications system 200 may implement aspects of wireless communications system 100. For example, the wireless communications system 200 may include a base station 105-a and a UE 115-a, which may be examples of a base station 105 and a UE 115 as described with reference to FIG. 1. In some examples, the wireless communications system 200 may support one or more radio access technologies including 4G systems such as LTE systems, LTE-A systems, or LTE-A Pro systems, 5G systems which may be referred to as NR systems, or a combination of these or other radio access technologies. Additionally, the base station 105-a and the UE 115-a may communicate over a carrier 205 that spans a wideband (e.g., carrier bandwidth 210) and may include a set of sub-bands 215 spanning the carrier bandwidth 210.

The base station 105-a and the UE 115-a may be configured with multiple antenna ports, which may be used to employ techniques such as transmit diversity, receive diversity, MIMO communications, beamforming, or a combination thereof. The antenna ports, physical antennas, or both of the base station 105-a and the UE 115-a may be located within one or more respective antenna arrays or antenna panels, which may support MIMO operations, transmit beamforming, receive beamforming, or a combination thereof. For example, the antennas or antenna arrays of the base station 105-a may be co-located at an antenna assembly, such as an antenna tower. In some examples, antennas or antenna arrays associated with the base station 105-a may be located in diverse geographic locations. The base station 105-a may have an antenna array with a number of rows and columns of antenna ports that the base station 105-a may use to support beamforming of communications with the UE 115-a. Likewise, the UE 115-a may have one or more antenna arrays that may support various MIMO operations, beamforming operations, or both. Additionally or alternatively, an antenna panel may support radio frequency beamforming for a signal transmitted via one or more antenna ports. An antenna may refer to an antenna element, an antenna panel, or a set of antennas, among other examples.

In some cases, the multiple antenna panels (e.g., at the base station 105-a, at the UE 115-a, or at both the base station 105-a and the UE 115-a) may each be configured for communications on one of the sub-bands 215. Here, each antenna panel may transmit communications by the sub-band associated with that antenna panel. For example, the UE 115-a may include two antenna panels: a first antenna panel configured for communications by the sub-band 215-a and a second antenna panel configured for communications by the sub-band 215-b. Here, the UE 115-a may transmit communications 230 by the sub-band 215-a using the first antenna panel and may transmit communications 230 by the sub-band 215-b using the second antenna panel.

In some cases, each antenna panel may include different element spacing to optimize communications via the associated sub-band 215. Additionally, each antenna panel may use a different set of phases to generate beams such that the beams are optimized for communications via one or more sub-bands 215 of the carrier bandwidth 210. Additionally, each antenna panel may include delay elements that may be used in conjunction with different element spacing and may compensate for the different element spacing (e.g., associated with different antenna panels). In the example of wireless communications system 200, one of the base station 105-a or the UE 115-a may include multiple antenna panels (e.g., each associated with one of the sub-bands 215) and the other of the base station 105-a or the UE 115-a may include a single antenna panel. In another example, both the base station 105-a and the UE 115-a may include multiple panels. In yet another example, both the base station 105-a and the UE 115-a may include a single antenna panel.

In some cases, the UE 115-a may optionally transmit, to the base station 105-a, a UE capability indication 220. For example, the UE capability indication 220 may indicate a capability of the UE 115-a to communicate a wideband communication with the base station 105-a via the set of sub-bands 215 (e.g., via a set of sub-band-based communications). For example, the UE capability indication 220 may indicate a method of optimization across the carrier bandwidth 210 or some other information related to the configuration of the antenna at the UE 115-a (e.g., antenna panel-specific information). That is, the UE capability indication 220 may indicate an element spacing associated with one or more antenna panels at the UE 115-a. Additionally, the UE capability indication 220 may indicate delay elements on the one or more antenna panels at the UE 115-a. In another example, the UE capability indication 220 may indicate one or more sub-bands within the carrier bandwidth 210. Here, the UE 115-a may be optimized for communications on the one or more sub-bands 215 (e.g., based on an antenna configuration at the UE 115-a) and the UE capability indication 220 may indicate the one or more sub-bands 215 via which the UE 115-a is optimized for communications. In another example, the UE capability indication 220 may include a list of one or more frequencies or bandwidths within the carrier bandwidth 210 (e.g., 70 GHz, 4 GHz bandwidth, 64 GHz, 2 GHz bandwidth). That is, an antenna configuration of the UE 115-a may optimize the UE 115-a for communications via the one or more frequencies or bandwidths.

The base station 105-a may identify a configuration 225 for communicating with the UE 115-a in the carrier bandwidth 210 using the set of sub-bands 215 (e.g., based on the capability of the UE 115-a). In some cases, the base station 105-a may additionally identify the configuration 225 based on the capability of the base station 105-a for communicating with the UE 115-a in the carrier bandwidth 210 using the set of sub-bands 215. For example, the antenna configuration of the UE 115-a may be associated with a first subset of the sub-bands 215 and the antenna configuration of the base station 105-a may be associated with a second subset of sub-bands 215. Here, the base station 105-a may identify the configuration 225 based on an intersection of the first and second subsets of sub-bands 215. For example, the base station 105-a may identify a configuration 225 associated with a sub-band 215 that is associated with the antenna configuration of the UE 115-a and the antenna configuration of the base station 105-a.

The configuration 225 may additionally indicate one or more guard bands 235 within the carrier bandwidth 210. That is, the carrier bandwidth 210 may include a set of sub-bands 215 for communications 230 between the base station 105-a and the UE 115-a. Additionally, the carrier bandwidth 210 may include a set of guard bands 235 associated with a set of frequency resources within the carrier bandwidth 210 where no communications 230 between the base station 105-a and the UE 115-a are performed. That is, communications 230 that are transmitted via a set of frequency resources that are near an edge of a sub-band 215 may be associated with an increased degradation when compared to communications 230 that are transmitted via a set of frequency resources that closer to a center frequency of the sub-band 215 (e.g., closer to a center frequency of the frequency range used by the UE 115-a). In some cases, the guard bands 235 may decrease a severity of degradation associated with the communications 230 as the communications 230 may be transmitted via frequency resources that are nearer to a center frequency of the sub-bands 215.

The base station 105-a may transmit the configuration 225 to the UE 115-a. In some cases, the base station 105-a may additionally transmit an indication of the base station capability (e.g., an indication of one or more sub-bands 215 or frequencies associated with an antenna configuration of the base station 105-a). Additionally, the configuration 225 may indicate, to the UE 115-a, the guard bands 235. For example, the configuration 225 may indicate one or more indices (e.g., resource block indices) associated with resource blocks within the guard bands 235. In some cases, the base station 105-a may transmit the indication of the guard bands 235 by remaining minimum system information (RMSI) or dedicated signaling (e.g., based on an antenna configuration of the UE 115-a). Based on receiving the indication of the guard bands 235, the UE 115-a may identify the guard bands 235. For example, the UE 115-a may identify a set of frequency resources within the carrier bandwidth 210 associated with the guard band 235-a that are between the sub-band 215-a and the sub-band 215-b. Here, the UE 115-a may refrain from transmitting or receiving communications 230 with the base station 105-a by the set of frequency resources of the guard band 235-a based on identifying the guard band 235-a.

The base station 105-a and the UE 115-a may then communicate (e.g., via the communications 23) over the carrier 205 in the carrier bandwidth 210 using one or more sub-bands 215 and in accordance with the configuration 225. For example, the base station 105-a may transmit one or more reference signals to the UE 115-a via the communications 230. Additionally, the communications 230 may include physical downlink control channel transmissions, physical downlink shared channel transmissions, and physical uplink shared channel transmissions.

Figure 3A:
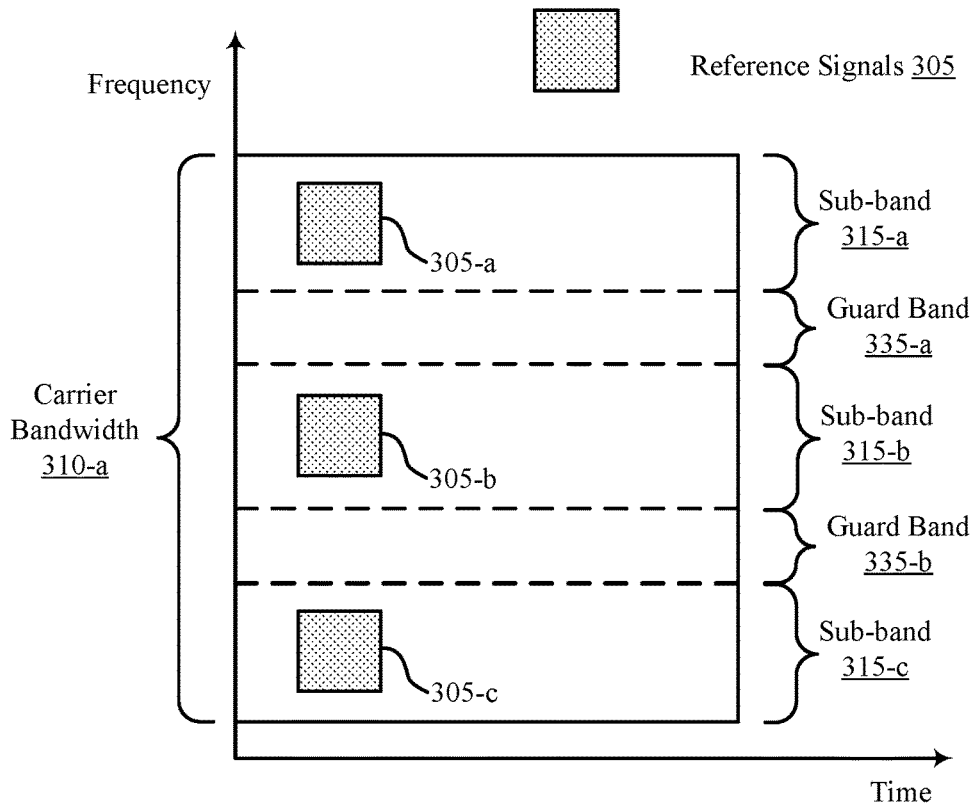
FIGS. 3A through 4B illustrate examples of carrier schemes that support communicating across a wideband using sub-bands in accordance with aspects of the present disclosure.
Figure 3B:
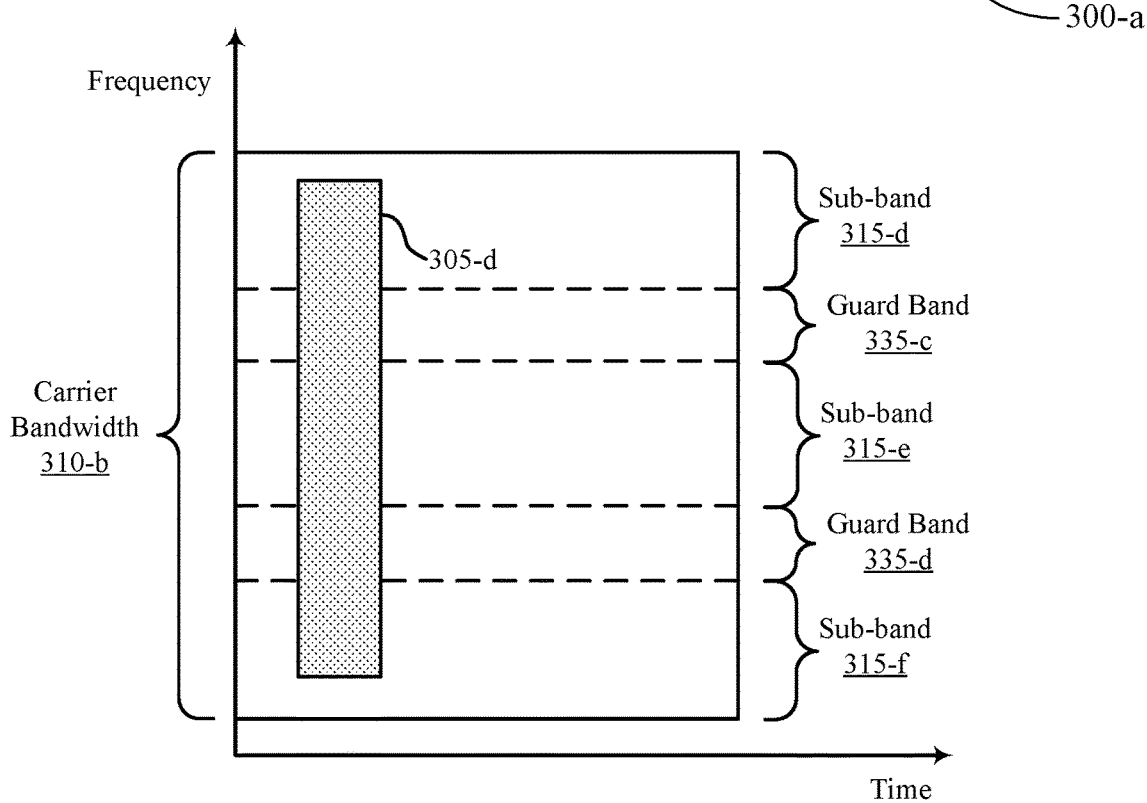

FIGS. 3A and 3B illustrate examples of carrier schemes 300 that support communicating across a wideband using sub-bands in accordance with aspects of the present disclosure. In some examples, the carrier schemes 300 may implement aspects of a wireless communications system 100 or 200 as described with reference to FIGS. 1 and 2. For example, the carrier schemes 300 may include a set of sub-bands 315 that span the carrier bandwidths 310, as described with reference to FIGS. 1 and 2. Additionally, the carrier schemes 300 may include reference signals 305, which may be examples of the communications as described with reference to FIG. 2. For example, a base station may transmit one or more of the reference signals 305 to a UE according to configuration for communicating in the carrier bandwidth using the set of sub-bands 315 as described with reference to FIGS. 1 and 2. The carrier scheme 300-a may illustrate a first configuration for reference signals 305 and the carrier scheme 300-b may illustrate a second configuration for reference signals 305.

The reference signals 305 may be channel state information-reference signals, sounding reference signals, tracking reference signals, phase tracking reference signals, or demodulation reference signals. When a UE receives one or more reference signals 305 from the base station, the UE may perform one or more channel estimation procedures. In some cases, the UE may perform an independent channel estimation procedure for each sub-band 315. That is, the UE may perform a first channel estimation procedure for sub-band 315-a (e.g., based on the reference signal 305-a) and a second channel estimation procedure for sub-band 315-b (e.g., based on the reference signal 305-b). In another example, the UE may perform a first channel estimation procedure for sub-band 315-d (e.g., based on a portion of the reference signal 305-d received via the sub-band 315-d) and a second channel estimation procedure for sub-band 315-e (e.g., based on a portion of the reference signal 305-d received via the sub-band 315-e).

Based on performing the one or more channel estimation procedures, the UE may radio resource management measurements to the base station. In some cases, the UE may indicate the one or more radio resource management measurements for the entire carrier bandwidth 310. In another case, the UE may indicate the one or more radio resource management measurements for each sub-band 315 individually. In some other cases, the UE may indicate the one or more radio resource management measurements for a subset of the sub-bands. For example, the UE may indicate a radio resource management measurements for the sub-band 315-e and the sub-band 315-f.

FIG. 3A may illustrate a carrier scheme 300-a associated with communications where the base station transmits a separate reference signal 305 via each of the sub-bands 315 of the carrier bandwidth 310-a. Here, the base station may transmit a reference signal 305 by each of the sub-bands 315. Additionally, each reference signal 305 may be associated with a unique identifier indicating a sub-band. For example, reference signal 305-b may be associated with a first identifier indicating the sub-band 315-b and reference signal 305-c may be associated with a second identifier that is different from the first identifier and indicates the sub-band 315-c.

FIG. 3B may illustrate a carrier scheme 300-b associated with communications where the base station transmits a reference signal 305 that spans more than one sub-band 315 within the carrier bandwidth 310-b. For example, the base station may transmit a reference signal 305-d associated with a first identifier indicating the carrier bandwidth 310-b. Additionally, the reference signal 305-d may be associated with additional identifiers each indicating a sub-band 315.

For example, the portion of the reference signal 305-*d* within the sub-band 315-*d* may be associated with an identifier indicating the sub-band 315-*d*. Additionally, the portion of the reference signal 305-*d* within the sub-band 315-*e* may be associated with an identifier indicating the sub-band 315-*e*.

In the case of carrier scheme 300-*a* and 300-*b*, the reference signal identifier indicating the sub-band may additionally signal, to the UE, a transmission configuration indicator (TCI) state, quasi-colocation (QCL) reference information associated with the sub-band, or both. The TCI state may indicate, to the UE, a directionality associated with communications received or transmitted by the associated sub-band 315. Additionally, the QCL reference information may indicate, to the UE, whether one or more properties associated with a first sub-band 315 may be assumed for a second sub-band 315 (e.g., if the two sub-bands are quasi-colocated). That is, each sub-band 315 may be associated with a TCI state and QCL reference information. In some cases, each sub-band 315 may be associated with a unique TCI state, unique QCL reference information, or both. Additionally or alternatively, a subset of the sub-bands 315 within the carrier bandwidth 310 may be associated with a unique TCI state, unique QCL reference information, or both.

Figure 4A:
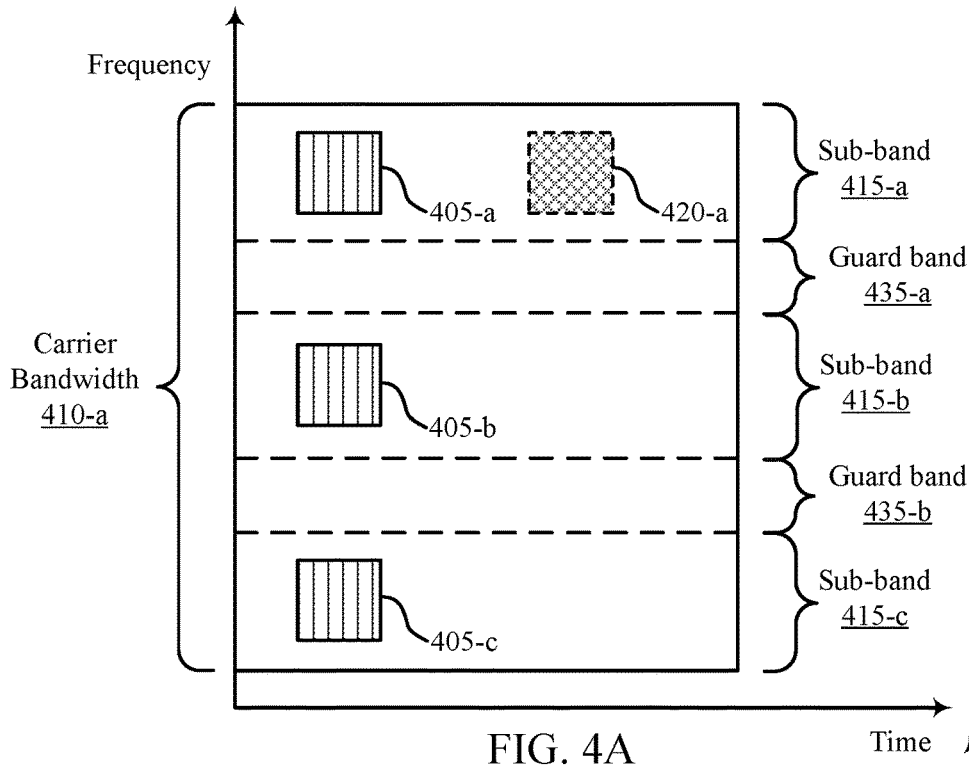
Figure 4B:
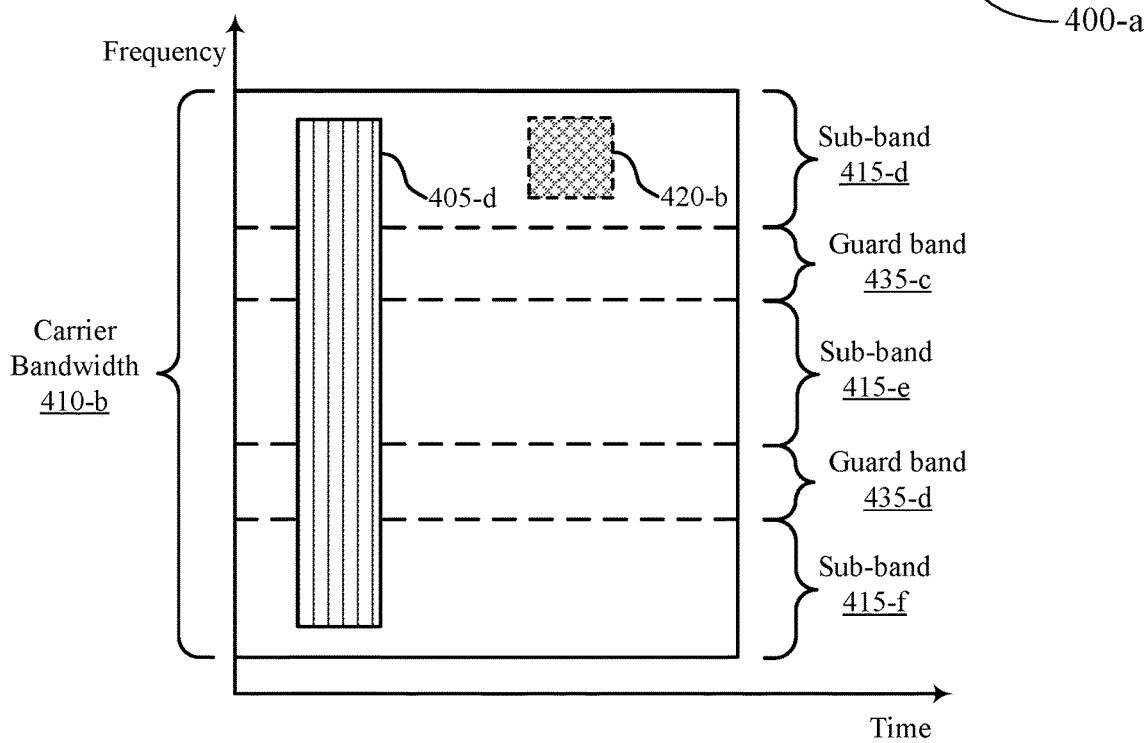

FIGS. 4A and 4B illustrate examples of carrier schemes 400 that support communicating across a wideband using sub-bands in accordance with aspects of the present disclosure. In some examples, the carrier schemes 400 may implement aspects of a wireless communications system 100 or 200 as described with reference to FIGS. 1 and 2. For example, the carrier schemes 400 may include a set of sub-bands 415 that span the carrier bandwidths 410, as described with reference to FIGS. 1 and 2. Additionally, the carrier schemes 400 may include transmissions 405, which may be examples of the communications as described with reference to FIG. 2. For example, a base station may transmit one or more of the transmissions 405 (e.g., physical downlink control channel transmissions, physical downlink shared channel transmissions) to a UE according to configuration for communicating in the carrier bandwidth 410 using the set of sub-bands 415 as described with reference to FIGS. 1 and 2. Additionally, the UE may transmit one or more of the transmissions 405 (e.g., physical uplink shared channel transmissions) to the base station according to the configuration for communicating in the carrier bandwidth 410.

In some cases, the base station may transmit one or more physical downlink control channel transmissions to the UE scheduling the transmissions 405, the feedback message 420, or both. In some cases, the base station may transmit a single physical downlink control channel transmission to schedule the transmissions 405 within one or more of the sub-bands 415. In one example, the base station may transmit the single physical downlink transmission within a single sub-band 415. In another example, the base station may transmit the single physical downlink control channel transmission across more than one sub-band 415. In some other cases, the base station may transmit physical downlink control channel transmissions within a sub-band 415 that schedules transmissions 405 associated with that sub-band 415. That is, the base station may transmit a physical downlink control channel transmission by the sub-band 415-*c* to schedule transmissions 405 via the sub-band 415-*c*.

Each carrier scheme may additionally indicate an optional feedback message 420 (e.g., an acknowledgement or negative acknowledgement message). For example, the UE may indicate, by the feedback, whether a decoding of one or more of the transmissions 405 is successful. In some cases, the UE may transmit a single feedback message 420 for each of the transmissions 405. For example, the feedback message 420-*a* may indicate a success of decoding each of the transmissions 405-*a*, 405-*b*, and 405-*c*. Additionally, feedback message 420-*b* may indicate whether the transmissions 405-*d* and 405-*e* are successfully decoded.

The carrier scheme 400-*a* may illustrate a first configuration for transmissions 405 and the carrier scheme 400-*b* may illustrate a second configuration for transmissions 405. In some cases, the communications between the base station and UE (e.g., as described with reference to FIG. 2) may utilize aspects of one or both of the carrier schemes 400. That is, a first type of transmission 405 (e.g., physical downlink shared channel transmissions, physical uplink shared channel transmissions) may be transmitted according to carrier scheme 400-*a* while a second type of transmission 405 may be transmitted according to carrier scheme 400-*b*.

FIG. 4A may illustrate a carrier scheme 400-*a* associated with communications where the transmissions 405 are transmitted via each of the sub-bands 415 of the carrier bandwidth 410-*a*. For example, each transmission 405 may be associated with a same channel (e.g., a physical downlink shared channel, a physical uplink shared channel). Additionally, each of the transmissions 405 may include one or more transport blocks each contained within a single sub-band 415. For example, the transmission 405-*a* may include a single transport block associated with frequency resources within the sub-band 415-*a*. Additionally, each transmission 405-*a* may be associated with a unique modulation and coding scheme, rank, or both. Additionally or alternatively, each transmission 405 may be received by a receive beam direction based on the associated sub-band 415.

For example, if the UE receives the transmission 405-*b* from the base station, the UE may select a receive beam direction (e.g., in a case that the UE includes more than one antenna panel) based on the transmission 405-*b* being received via the sub-band 415-*b*. Thus, a demodulation reference signal associated with each of the transmissions 405 may be processed individually. For example, a UE may perform a first channel estimation procedure associated with the sub-band 415-*b* (e.g., using a demodulation reference signal within the transmission 405-*b*) and may perform a second channel estimation procedure associated with the sub-band 415-*c* (e.g., using a demodulation reference signal within transmission 405-*c*).

FIG. 4B may illustrate a carrier scheme 400-*b* associated with communications where the transmissions 405 span more than one sub-band 415 within the carrier bandwidth 410-*b*. For example, each transmission 405 may be associated with a same channel (e.g., a physical downlink shared channel, a physical uplink shared channel). Additionally, the transmission 405-*d* spans sub-band 415-*d*, 415-*e*, and 415-*f*. In some cases, a transmitting device may utilize an interleaver to map data to resources of the transmission 405-*d* that span the sub-bands 415. In some cases, the interleaver may map data to resources within a first sub-band 415 prior to mapping data to resources within a second sub-band 415. For example, the interleaver may map all of the data to the resources within the sub-band 415-*d* prior to mapping any data to the resources within the sub-band 415-*e*.

Here, the transmission 405-*d* may be associated with more than one carrier block or carrier block group (e.g., resource blocks). For example, the transmission 405-*d* may be associated with a first carrier block or carrier block group within the sub-band 415-*d* and a second carrier block or carrier block group within the sub-band 415-*e*. In some cases, each carrier block or carrier block group (e.g., that is within a sub-band 415) may be associated with a modulation coding scheme based on the sub-band 415. For example, the carrier block or carrier block group carrying the transmission 405-*d* within the sub-band 415-*f* may be associated with a modulation coding scheme selected to increase a reliability of the transmission 405-*d* within the sub-band 415-*f*.

Figure 5:
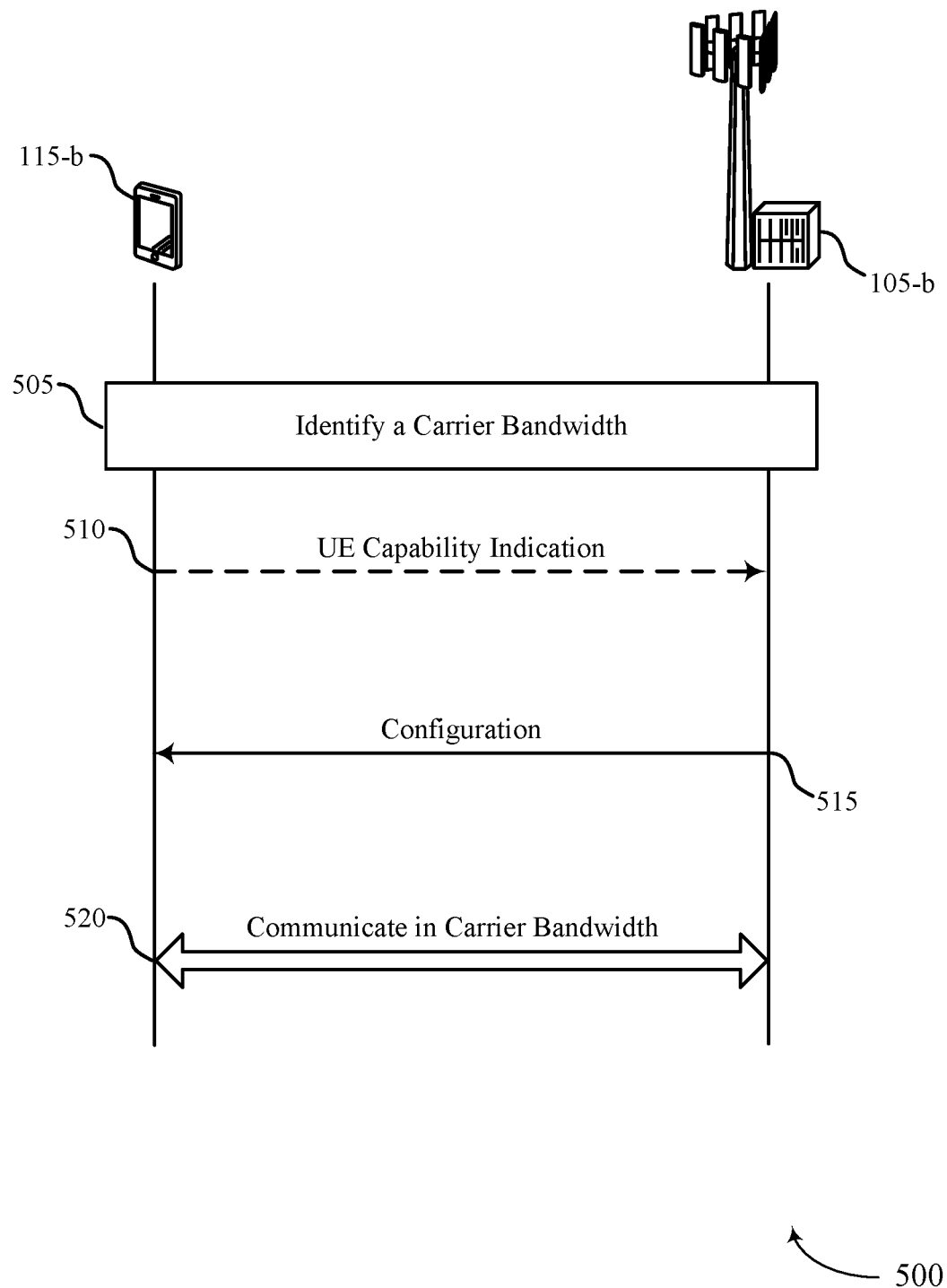
FIG. 5 illustrates an example of a process flow that supports communicating across a wideband using sub-bands in accordance with aspects of the present disclosure.

FIG. 5 illustrates an example of a process flow 500 that supports communicating across a wideband using sub-bands in accordance with aspects of the present disclosure. In some examples, the process flow 500 may implement aspects of a wireless communications system 100 or 200 as described with reference to FIGS. 1 and 2. The process flow 500 may be based on a configuration by a base station 105-*b* or a UE 115-*b* and may be implemented by the UE 115-*b* to support reliable communications for wideband array operations (e.g., in mmW systems).

The base station 105-*b* and the UE 115-*b* may be examples of a base station 105 and a UE 115, as described with reference to FIGS. 1 through 4. In the following description of the process flow 500, the operations between the base station 105-*b* and the UE 115-*b* may be communicated in a different order than the example order shown, or the operations performed by the base station 105-*b* and the UE 115-*b* may be performed in different orders or at different times. Some operations may also be omitted from the process flow 500, and other operations may be added to the process flow 500.

At 505, the UE 115-*b* and the base station 105-*b* may identify a carrier bandwidth for communicating a wideband communication between the UE 115-*b* and the base station 105-*b*.

At 510, the UE 115-*b* may optionally transmit, to the base station 105-*b*, an indication of a capability of the UE 115-*b* to communicate the wideband communication with the base station 105-*b* via a set of sub-band-based communications with the base station 105-*b*, the set of sub-band-based communications being over a set of sub-bands spanning a carrier bandwidth. For example the UE 115-*b* may indicate an antenna configuration of the UE 115-*b*, the antenna configuration associated with an element spacing of an antenna of the UE 115-*b*, a set of phases utilized by the antenna, one or more delay elements of the antenna, or a combination thereof. In another example, the UE 115-*b* may indicate a subset of the set of sub-bands, the subset of the set of sub-bands representing a first UE preference for sub-bands to be used in communicating with the base station 105-*b*, the subset of the set of sub-bands being based at least in part on a center frequency associated with an antenna of the UE 115-*b*. For example, the subset of the set of sub-bands may be based on the center frequency of a frequency range used by the UE 115-*b*. Additionally or alternatively, the subset of the set of sub-bands may be based on an element spacing associated with an antenna of the UE 115-*b*. In another example, the UE 115-*b* may indicate one or more frequencies associated with an antenna of the UE 115-*b*, transmitting an indication of one or more bandwidths associated with the antenna of the UE 115-*b*, or both.

At 515, the base station 105-*b* may transmit, to the UE 115-*b*, a configuration for communicating with the base station 105-*b* in the carrier bandwidth using the set of sub-bands. In some cases, the configuration may be based on the UE capability. Additionally, the configuration may be based on an intersection of a first subset of the set of sub-bands associated with an antenna of the UE 115-*b* and a second subset of the set of sub-bands associated with an antenna of the base station 105-*b*.

At 520, the base station 105-*b* and UE 115-*b* may communicate in the carrier bandwidth using one or more of the set of sub-bands in accordance with the configuration. That is, the UE 115-*b* may receive one or more reference signals from the base station 105-*b* in accordance with the configuration. Additionally, the UE 115-*b* and base station 105-*b* may communicate physical downlink control channel transmissions, physical downlink shared channel transmissions, or physical uplink shared channel transmissions in accordance with the configuration.

Figure 6:
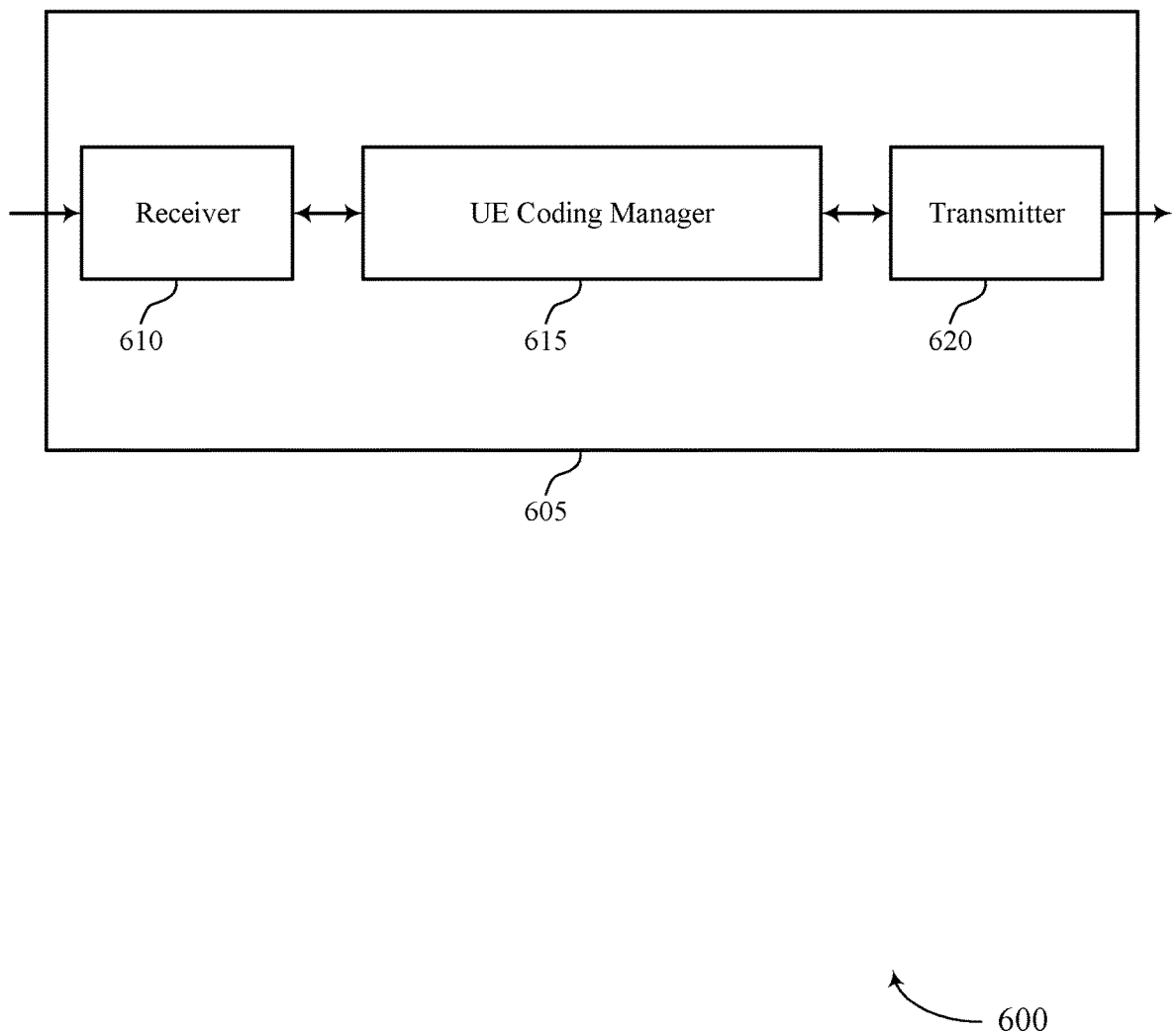
FIGS. 6 and 7 show block diagrams of devices that support communicating across a wideband using sub-bands in accordance with aspects of the present disclosure.

FIG. 6 shows a block diagram 600 of a device 605 that supports communicating across a wideband using sub-bands in accordance with aspects of the present disclosure. The device 605 may be an example of aspects of a UE 115 as described herein. The device 605 may include a receiver 610, a UE coding manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to communicating across a wideband using sub-bands, etc.). Information may be passed on to other components of the device 605. The receiver 610 may be an example of aspects of the transceiver 920 described with reference to FIG. 9. The receiver 610 may utilize a single antenna or a set of antennas.

The UE Coding Manager 615 may identify a carrier bandwidth for communicating a wideband communication with a base station, receive, from the base station, a configuration for communicating with the base station in the carrier bandwidth using a plurality of sub-band based communications that are over a plurality of sub-bands spanning the carrier bandwidth, and communicate with the base station in the carrier bandwidth using one or more of the set of sub-bands in accordance with the configuration. The UE Coding Manager 615 may be an example of aspects of the UE Coding Manager 910 described herein.

The actions performed by the UE Coding Manager 615 as described herein may be implemented to realize one or more potential advantages. For example, identifying a carrier bandwidth for communicating a wideband communication with a base station may allow the device 605 to more accurately estimate channel characteristics of each sub-band. Accurately estimating channel characteristics across a carrier bandwidth may increase transmission reliability for wideband array operations. In some examples, communicating using multiple communication beams may further potentially reduce power consumption by reducing the number of failed transmission and reception procedures performed by the device 605.

The UE Coding Manager 615, or its sub-components, may be implemented in hardware, code (e.g., software or firmware) executed by a processor, or any combination thereof. If implemented in code executed by a processor, the functions of the UE Coding Manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE Coding Manager 615, or its sub-components, may be physically located at various positions, including being distributed such that portions of functions are implemented at different physical locations by one or more physical components. In some examples, the UE Coding Manager 615, or its sub-components, may be a separate and distinct component in accordance with various aspects of the present disclosure. In some examples, the UE Coding Manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
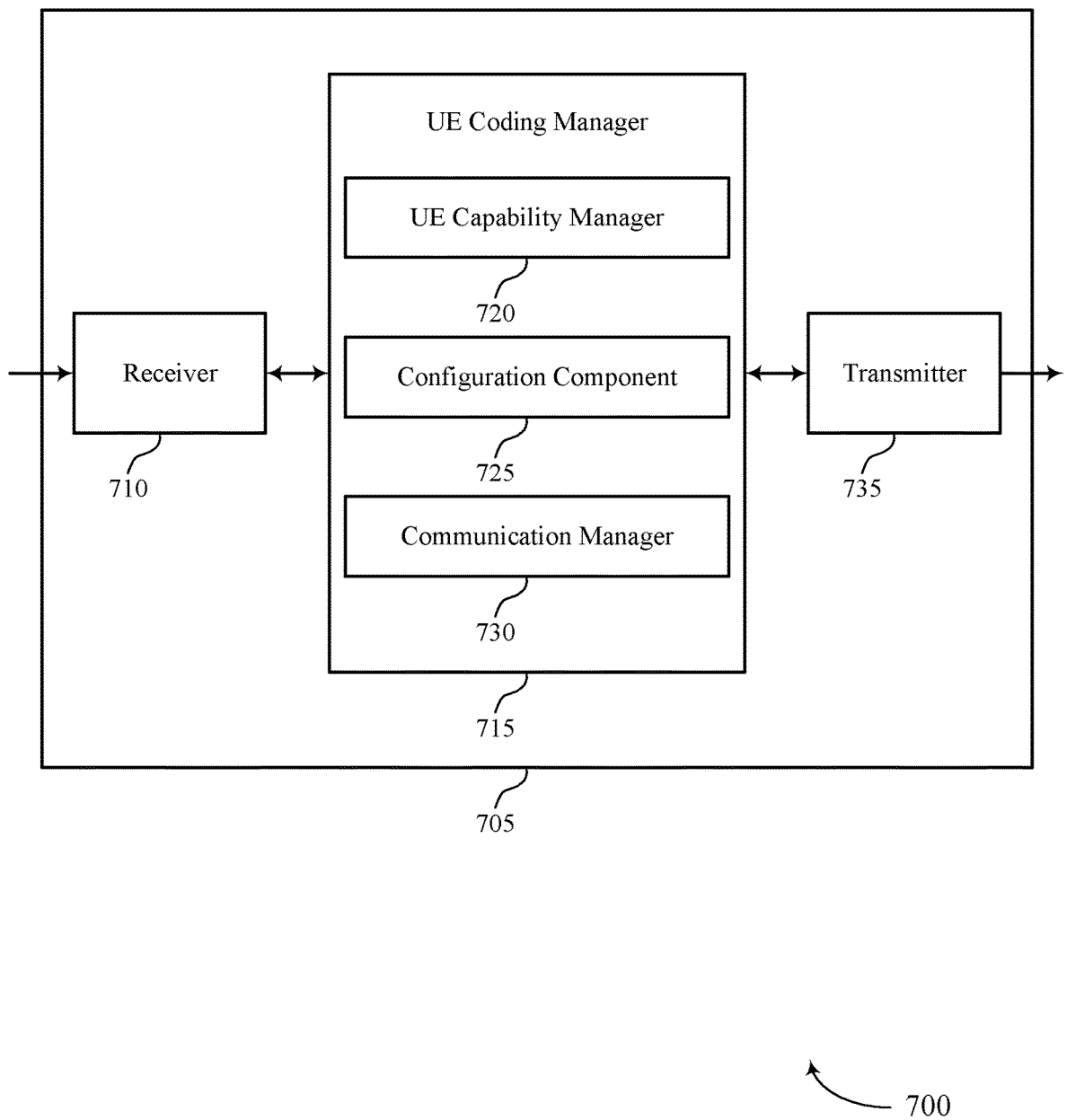

FIG. 7 shows a block diagram 700 of a device 705 that supports communicating across a wideband using sub-bands in accordance with aspects of the present disclosure. The device 705 may be an example of aspects of a device 605, or a UE 115 as described herein. The device 705 may include a receiver 710, a UE coding manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to communicating across a wideband using sub-bands, etc.). Information may be passed on to other components of the device 705. The receiver 710 may be an example of aspects of the transceiver 920 described with reference to FIG. 9. The receiver 710 may utilize a single antenna or a set of antennas.

The UE Coding Manager 715 may be an example of aspects of the UE Coding Manager 615 as described herein. The UE Coding Manager 715 may include a UE capability manager 720, a configuration component 725, and a communication manager 730. The UE Coding Manager 715 may be an example of aspects of the UE Coding Manager 910 described herein.

The UE capability manager 720 may identify a carrier bandwidth for communicating a wideband communication with a base station.

The configuration component 725 may receive, from the base station, a configuration for communicating with the base station in the carrier bandwidth using a plurality of sub-band based communications that are over a plurality of sub-bands spanning the carrier bandwidth.

The communication manager 730 may communicate with the base station in the carrier bandwidth using one or more of the set of sub-bands in accordance with the configuration.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
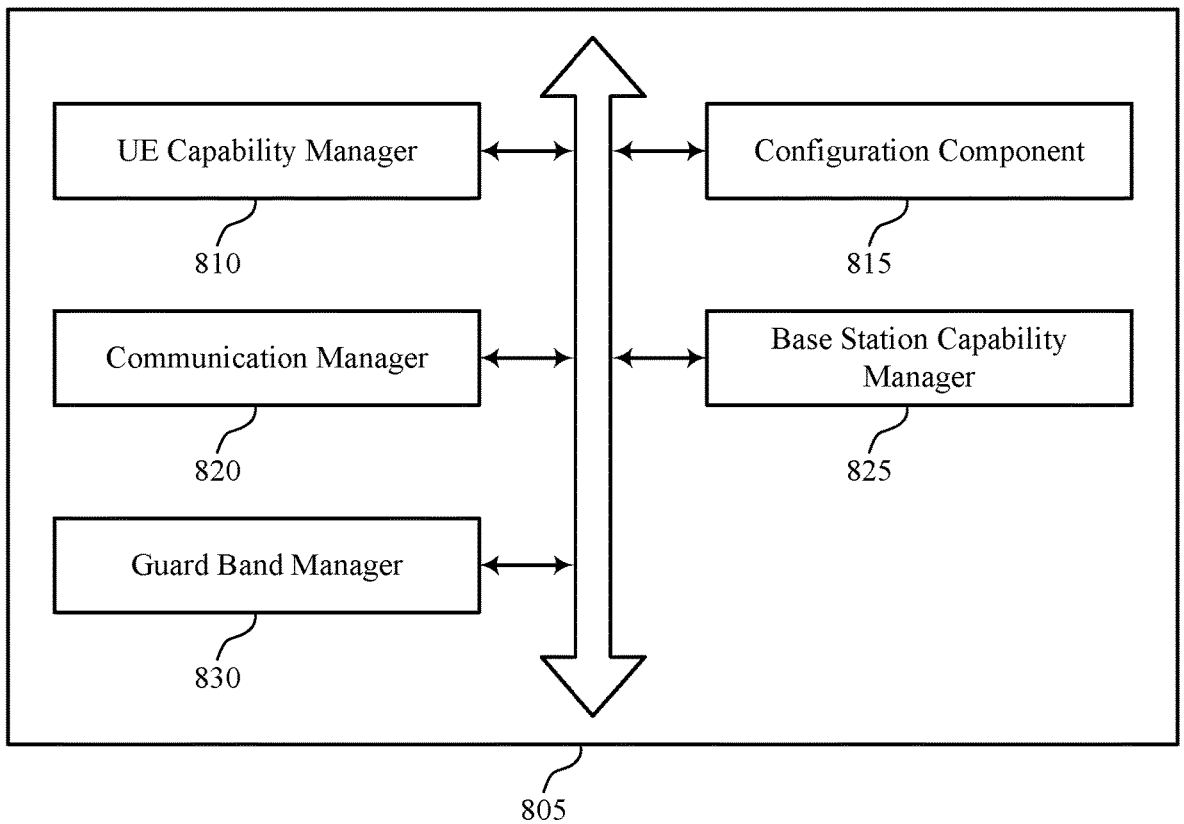
FIG. 8 shows a block diagram of a coding manager that supports communicating across a wideband using sub-bands in accordance with aspects of the present disclosure.

FIG. 8 shows a block diagram 800 of a UE Coding Manager 805 that supports communicating across a wideband using sub-bands in accordance with aspects of the present disclosure. The UE Coding Manager 805 may be an example of aspects of a UE Coding Manager 615, a UE Coding Manager 715, or a UE Coding Manager 910 described herein. The UE Coding Manager 805 may include a UE capability manager 810, a configuration component 815, a communication manager 820, a base station capability manager 825, and a guard band manager 830. Each of these modules may communicate, directly or indirectly, with one another (e.g., via one or more buses).

The UE capability manager 810 may identify a carrier bandwidth for communicating a wideband communication with a base station. In some instances, the UE capability manager 810 may transmit, to the base station, an indication of a capability of the UE to communicate a wideband communication with the base station via a set of sub-band-based communications with the base station. In some examples, the UE capability manager 810 may transmit an indication of an antenna configuration of the UE, the antenna configuration associated with an element spacing of an antenna of the UE, a set of phases utilized by the antenna, one or more delay elements of the antenna, or a combination thereof. In some cases, the UE capability manager 810 may transmit an indication of a subset of the set of sub-bands, the subset of the set of sub-bands representing a first UE preference for sub-bands to be used in communicating with the base station, the subset of the set of sub-bands being based on at least one of a center frequency of a frequency range used by the UE or an element spacing associated with an antenna of the UE. In some instances, the UE capability manager 810 may transmit an indication of one or more frequencies associated with an antenna of the UE, transmitting an indication of one or more bandwidths associated with the antenna of the UE, or both.

The configuration component 815 may receive, from the base station, a configuration for communicating with the base station in the carrier bandwidth using a plurality of sub-band based communications that are over a plurality of sub-bands spanning the carrier bandwidth. In some examples, the configuration component 815 may receive an indication of one or more resource blocks within the carrier bandwidth associated with the set of frequency resources, where identifying the set of frequency resources is based on the indication of one or more resource blocks. In some cases, the configuration for communicating with the base station in the carrier bandwidth is based on an intersection of a first subset of the set of sub-bands associated with an antenna of the UE and a second subset of the set of sub-bands associated with an antenna of the base station.

The communication manager 820 may communicate with the base station in the carrier bandwidth using one or more of the set of sub-bands in accordance with the configuration.

In some examples, the communication manager 820 may receive a first reference signal by a first sub-band of the set of sub-bands associated with a first identifier. In some cases, the communication manager 820 may receive a second reference signal by a second sub-band of the set of sub-bands different from the first sub-band, the second reference signal associated with a second identifier different from the first identifier. In some examples, the communication manager 820 may perform a first channel estimation procedure for the first sub-band based on the first reference signal. In some cases, the communication manager 820 may perform a second channel estimation procedure for the second sub-band based on the second reference signal. In some cases, the first reference signal and the second reference signal are channel state information-reference signals, sounding reference signals, tracking reference signals, phase tracking reference signals, or demodulation reference signals. In some cases, the first reference signal and the second reference signal are each associated with a third identifier indicating the carrier bandwidth.

In some examples, the communication manager 820 may identify a first transmission configuration indicator state and second QCL reference information associated with the first sub-band based on the first identifier. In some cases, the communication manager 820 may identify a second transmission configuration indicator state and second QCL reference information associated with the second sub-band based on the second identifier. In some instances, the communication manager 820 may transmit, to the base station and in accordance with the configuration, radio resource management measurements associated with a single sub-band of the set of sub-bands, a set of sub-bands of the set of sub-bands, or the set of sub-bands. In some examples, the communication manager 820 may transmit, to the base station and in accordance with the configuration, channel state information associated with a single sub-band of the set of sub-bands, a set of sub-bands of the set of sub-bands, or the set of sub-bands.

In some examples, the communication manager 820 may receive, over at least one sub-band, a physical downlink control channel message scheduling one or more transmissions across a single sub-band, a subset of the set of sub-bands, or each of the set of sub-bands. In some cases, the communication manager 820 may receive a downlink shared channel transmission including a set of transport blocks, where each transport block is received using one sub-band of the set of sub-bands. In some cases, each transport block of the set of transport blocks is associated with a modulation and coding scheme and rank that is based on a sub-band used to receive each transport block. In some instances, the communication manager 820 may receive a downlink shared channel transmission using two or more sub-bands, the downlink shared channel transmission including a single transport block spanning two or more sub-bands. In some examples, the single transport block includes two or more carrier block groups each associated with one of the two or more sub-bands. In some examples, the communication manager 820 may transmit a feedback message indicating whether a decoding of a downlink message spanning more than one sub-band is successful. In some cases, each carrier block group is associated with a modulation coding scheme.

The base station capability manager 825 may receive, from the base station, an indication of an antenna configuration of the base station, the antenna configuration associated with one or more of an element spacing of an antenna of the base station, a set of phases utilized by the antenna, or one or more delay elements of the antenna, where receiving the configuration for communicating with the base station in the carrier bandwidth is based on receiving the indication of the antenna configuration of the base station.

The guard band manager 830 may identify, based on receiving the configuration, a set of frequency resources within the carrier bandwidth between a first sub-band of the set of sub-bands and a second sub-band of the set of sub-bands. In some examples, the guard band manager 830 may refrain from transmitting or receiving communications with the base station by the set of frequency resources based on the identifying.

Figure 9:
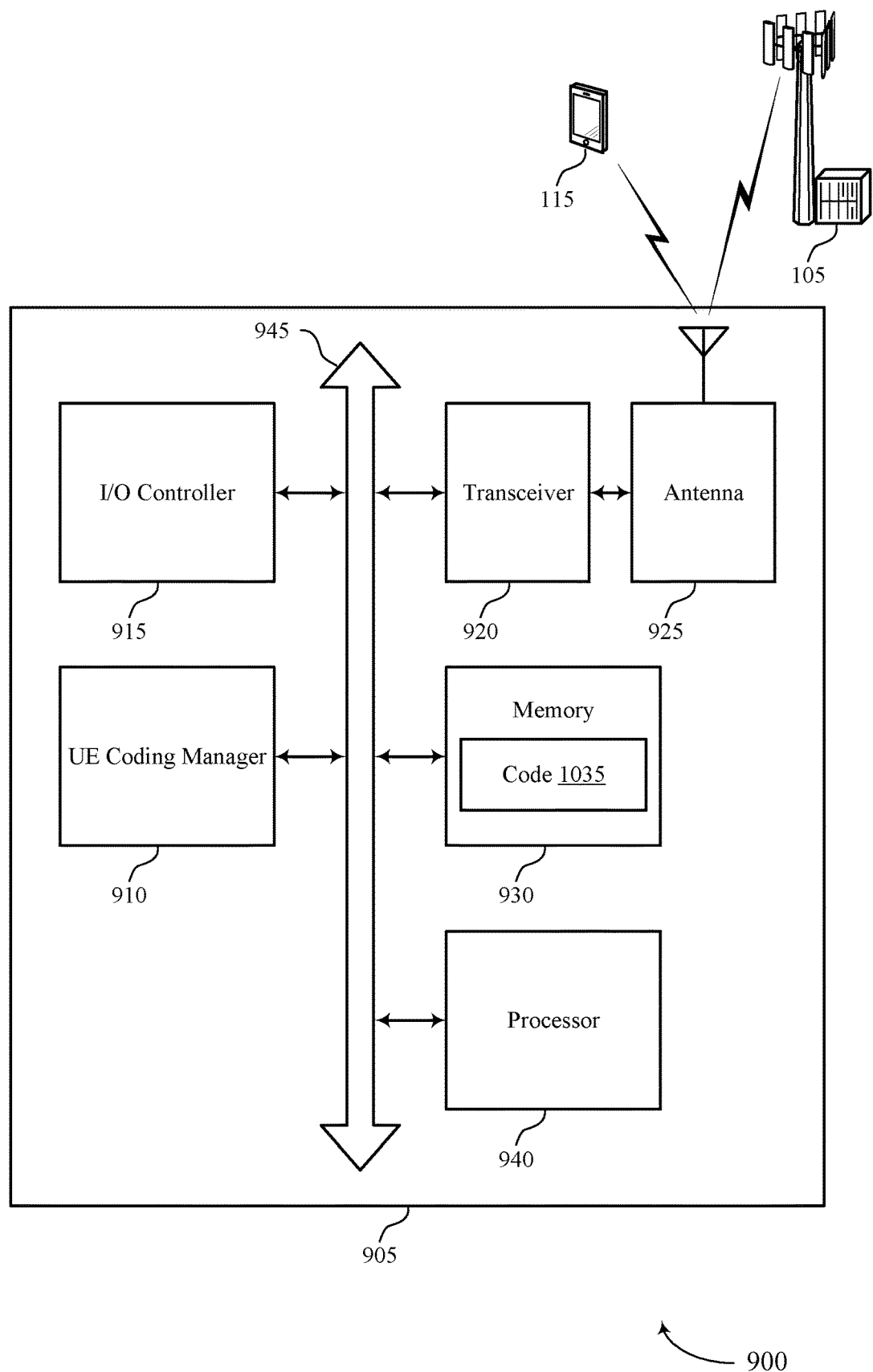
FIG. 9 shows a diagram of a system including a device that supports communicating across a wideband using sub-bands in accordance with aspects of the present disclosure.

FIG. 9 shows a diagram of a system 900 including a device 905 that supports communicating across a wideband using sub-bands in accordance with aspects of the present disclosure. The device 905 may be an example of or include the components of device 605, device 705, or a UE 115 as described herein. The device 905 may include components for bi-directional voice and data communications including components for transmitting and receiving communications, including a UE coding manager 910, an I/O controller 915, a transceiver 920, an antenna 925, memory 930, and a processor 940. These components may be in electronic communication via one or more buses (e.g., bus 945).

The UE Coding Manager 910 may identify a carrier bandwidth for communicating a wideband communication with a base station, receive, from the base station, a configuration for communicating with the base station in the carrier bandwidth using a plurality of sub-band based communications that are over a plurality of sub-bands spanning the carrier bandwidth, and communicate with the base station in the carrier bandwidth using one or more of the set of sub-bands in accordance with the configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting communicating across a wideband using sub-bands).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
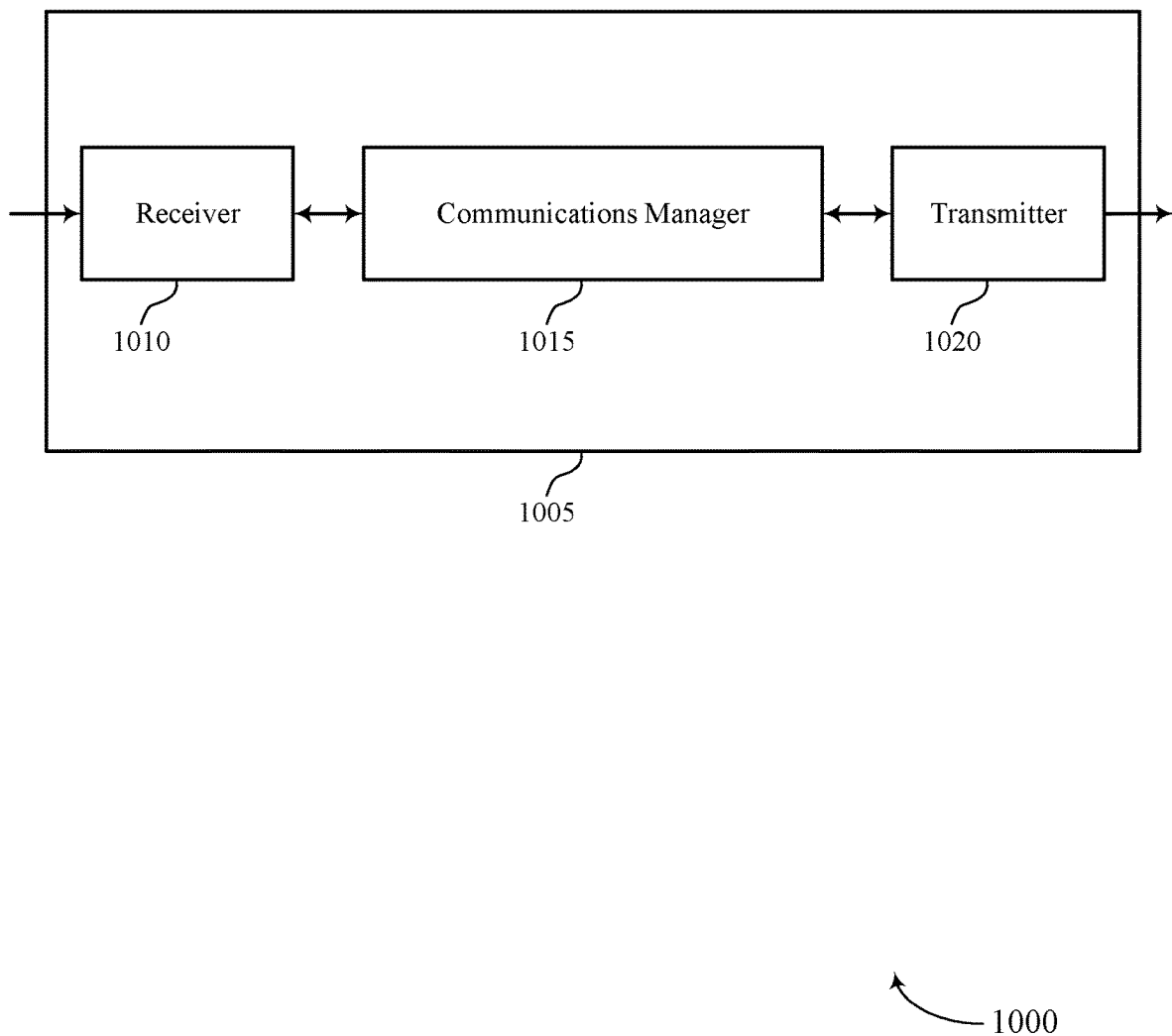
FIGS. 10 and 11 show block diagrams of devices that support communicating across a wideband using sub-bands in accordance with aspects of the present disclosure.

FIG. 10 shows a block diagram 1000 of a device 1005 that supports communicating across a wideband using sub-bands in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to communicating across a wideband using sub-bands, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a carrier bandwidth for communicating a wideband communication with a UE, transmit, to the UE, a configuration for communicating with the base station in the carrier bandwidth using a plurality of sub-band based communications that are over a plurality of sub-bands spanning the carrier bandwidth, and communicate with the UE in the carrier bandwidth using one or more of the set of sub-bands in accordance with the configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
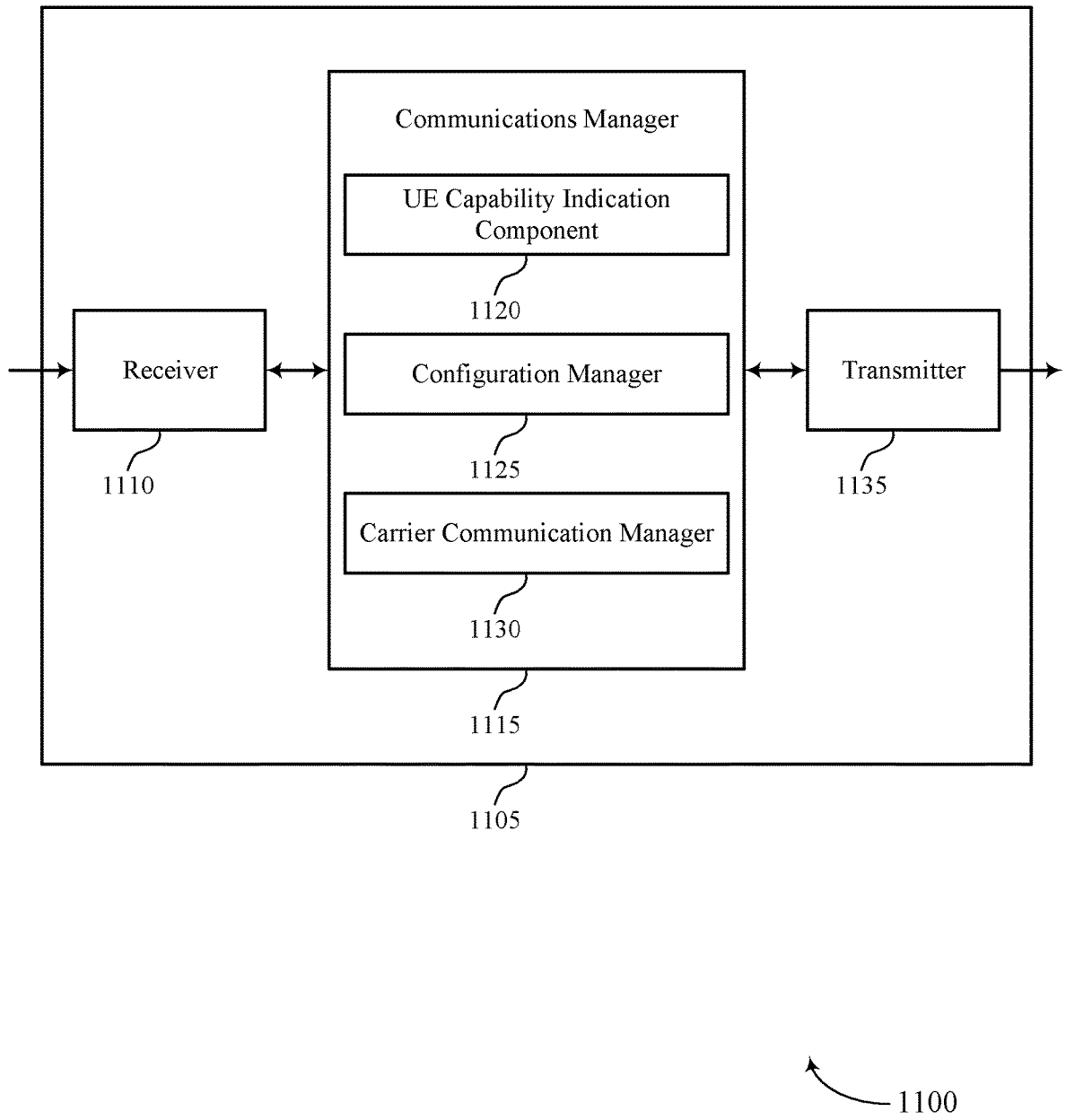

FIG. 11 shows a block diagram 1100 of a device 1105 that supports communicating across a wideband using sub-bands in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to communicating across a wideband using sub-bands, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a UE capability indication component 1120, a configuration manager 1125, and a carrier communication manager 1130. The communications manager 1115 may be an example of aspects of the communications manager 1310 described herein.

The UE capability indication component 1120 may identify a carrier bandwidth for communicating a wideband communication with a UE.

The configuration manager 1125 may transmit, to the UE, a configuration for communicating with the base station in the carrier bandwidth using a plurality of sub-band based communications that are over a plurality of sub-bands spanning the carrier bandwidth.

The carrier communication manager 1130 may communicate with the UE in the carrier bandwidth using one or more of the set of sub-bands in accordance with the configuration.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
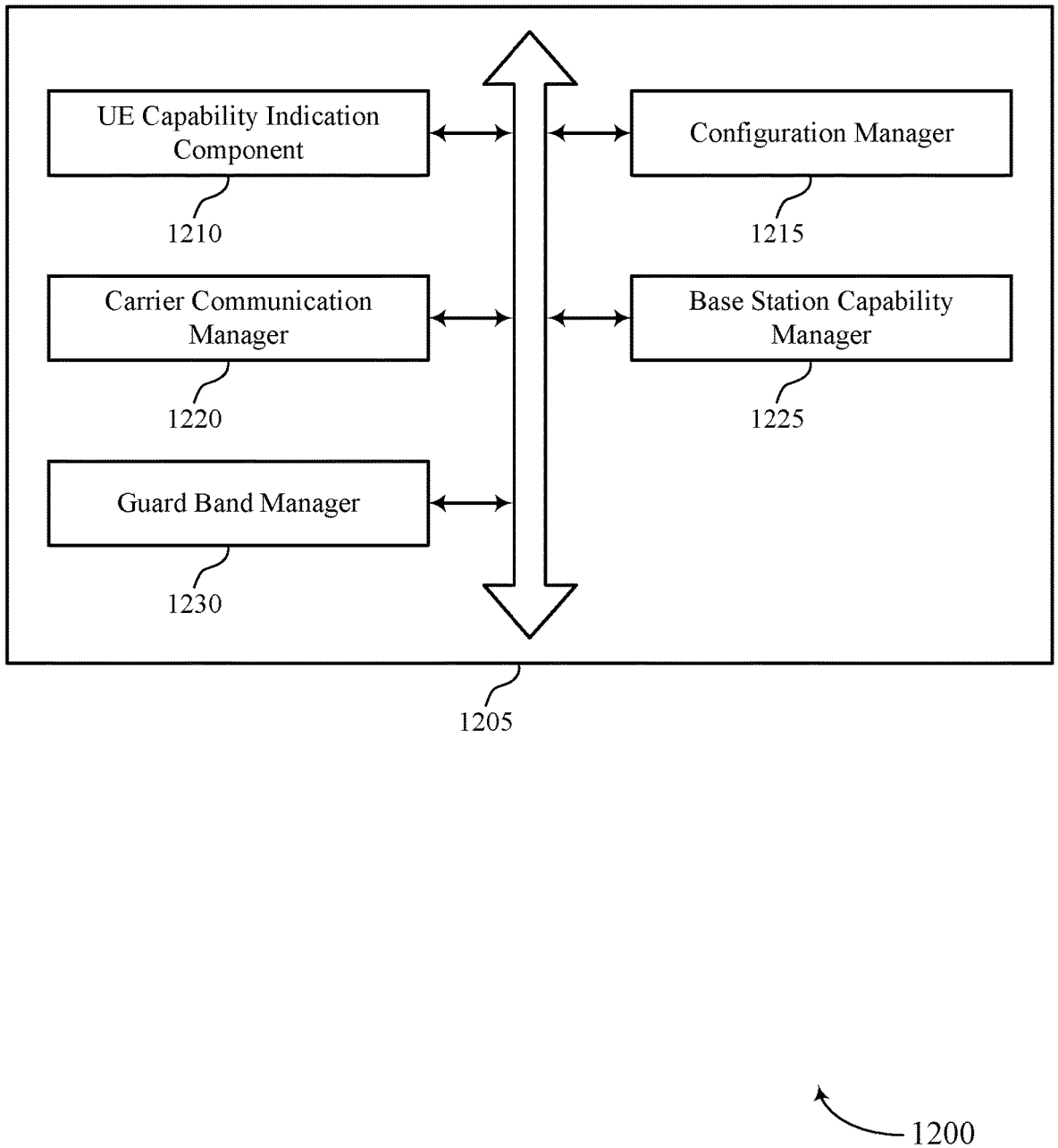
FIG. 12 shows a block diagram of a communications manager that supports communicating across a wideband using sub-bands in accordance with aspects of the present disclosure.

FIG. 12 shows a block diagram 1200 of a communications manager 1205 that supports communicating across a wideband using sub-bands in accordance with aspects of the present disclosure. The communications manager 1205 may be an example of aspects of a communications manager 1015, a communications manager 1115, or a communications manager 1310 described herein. The communications manager 1205 may include a UE capability indication component 1210, a configuration manager 1215, a carrier communication manager 1220, a base station capability manager 1225, and a guard band manager 1230. Each of these modules may communicate, directly or indirectly, with one another (e.g., via one or more buses).

The UE capability indication component 1210 may identify a carrier bandwidth for communicating a wideband communication with a UE. In some instances, the UE capability indication component 1210 receive, from the UE, an indication of a capability of the UE to communicate the wideband communication with the base station via the plurality of sub-band-based communications with the base station. In some examples, the UE capability indication component 1210 may receive an indication of an antenna configuration of the UE, the antenna configuration associated with an element spacing of an antenna of the UE, a set of phases utilized by the antenna, one or more delay elements of the antenna, or a combination thereof. In some cases, the UE capability indication component 1210 may receive an indication of a subset of the set of sub-bands, the subset of the set of sub-bands representing a first UE preference for sub-bands to be used in communicating with the base station, the subset of the set of sub-bands being based on at least one of a center frequency of a frequency range used by the UE or an element spacing associated with an antenna of the UE. In some instances, the UE capability indication component 1210 may receive an indication of one or more frequencies associated with an antenna of the UE, transmitting an indication of one or more bandwidths associated with the antenna of the UE, or both.

The configuration manager 1215 may transmit, to the UE, a configuration for communicating with the base station in the carrier bandwidth using a plurality of sub-band based communications that are over a plurality of sub-bands spanning the carrier bandwidth. In some examples, the configuration manager 1215 may transmit an indication of one or more resource blocks within the carrier bandwidth associated with the set of frequency resources, where identifying the set of frequency resources is based on the indication of one or more resource blocks. In some cases, the configuration for communicating with the base station in the carrier bandwidth is based on an intersection of a first subset of the set of sub-bands associated with an antenna of the UE and a second subset of the set of sub-bands associated with an antenna of the base station.

The carrier communication manager 1220 may communicate with the UE in the carrier bandwidth using one or more of the set of sub-bands in accordance with the configuration. In some examples, the carrier communication manager 1220 may transmit a first reference signal by a first sub-band of the set of sub-bands associated with a first identifier. In some cases, the carrier communication manager 1220 may transmit a second reference signal by a second sub-band of the set of sub-bands different from the first sub-band, the second reference signal associated with a second identifier different from the first identifier. In some cases, the first reference signal and the second reference signal are channel state information-reference signals, sounding reference signals, tracking reference signals, phase tracking reference signals, or demodulation reference signals. In some instances, the first reference signal and the second reference signal are each associated with a third identifier indicating the carrier bandwidth.

In some examples, the carrier communication manager 1220 may receive, from the UE and in accordance with the configuration, radio resource management measurements associated with a single sub-band of the set of sub-bands, a set of sub-bands of the set of sub-bands, or the set of sub-bands. In some cases, the carrier communication manager 1220 may receive, from the UE and in accordance with the configuration, channel state information associated with a single sub-band of the set of sub-bands, a set of sub-bands of the set of sub-bands, or the set of sub-bands.

In some instances, the carrier communication manager 1220 may transmit, over at least one sub-band, a physical downlink control channel message scheduling one or more transmissions across a single sub-band, a subset of the set of sub-bands, or each of the set of sub-bands. In some examples, the carrier communication manager 1220 may transmit a downlink shared channel transmission including a set of transport blocks, where each transport block is transmitted using one sub-band of the set of sub-bands. In some cases, each transport block of the set of transport blocks is associated with a modulation and coding scheme and rank that is based on a sub-band used to receive each transport block. In some cases, the carrier communication manager 1220 may transmit a downlink shared channel transmission using two or more sub-bands, the downlink shared channel transmission including a single transport block spanning two or more sub-bands. In some examples, the single transport block includes two or more carrier block groups each associated with one of the two or more sub-bands. In some cases, each carrier block group is associated with a modulation coding scheme.

In some examples, the carrier communication manager 1220 may receive a feedback message indicating whether a decoding of a downlink message spanning more than one sub-band is successful.

The base station capability manager 1225 may transmit, to the UE, an indication of an antenna configuration of the base station, the antenna configuration associated with one or more of an element spacing of an antenna of the base station, a set of phases utilized by the antenna, or one or more delay elements of the antenna, where receiving the configuration for communicating with the base station in the carrier bandwidth is based on receiving the indication of the antenna configuration of the base station.

The guard band manager 1230 may identify, based on the configuration, a set of frequency resources within the carrier bandwidth between a first sub-band of the set of sub-bands and a second sub-band of the set of sub-bands. In some examples, the guard band manager 1230 may refrain from transmitting or receiving communications with the UE by the set of frequency resources based on the identifying.

Figure 13:
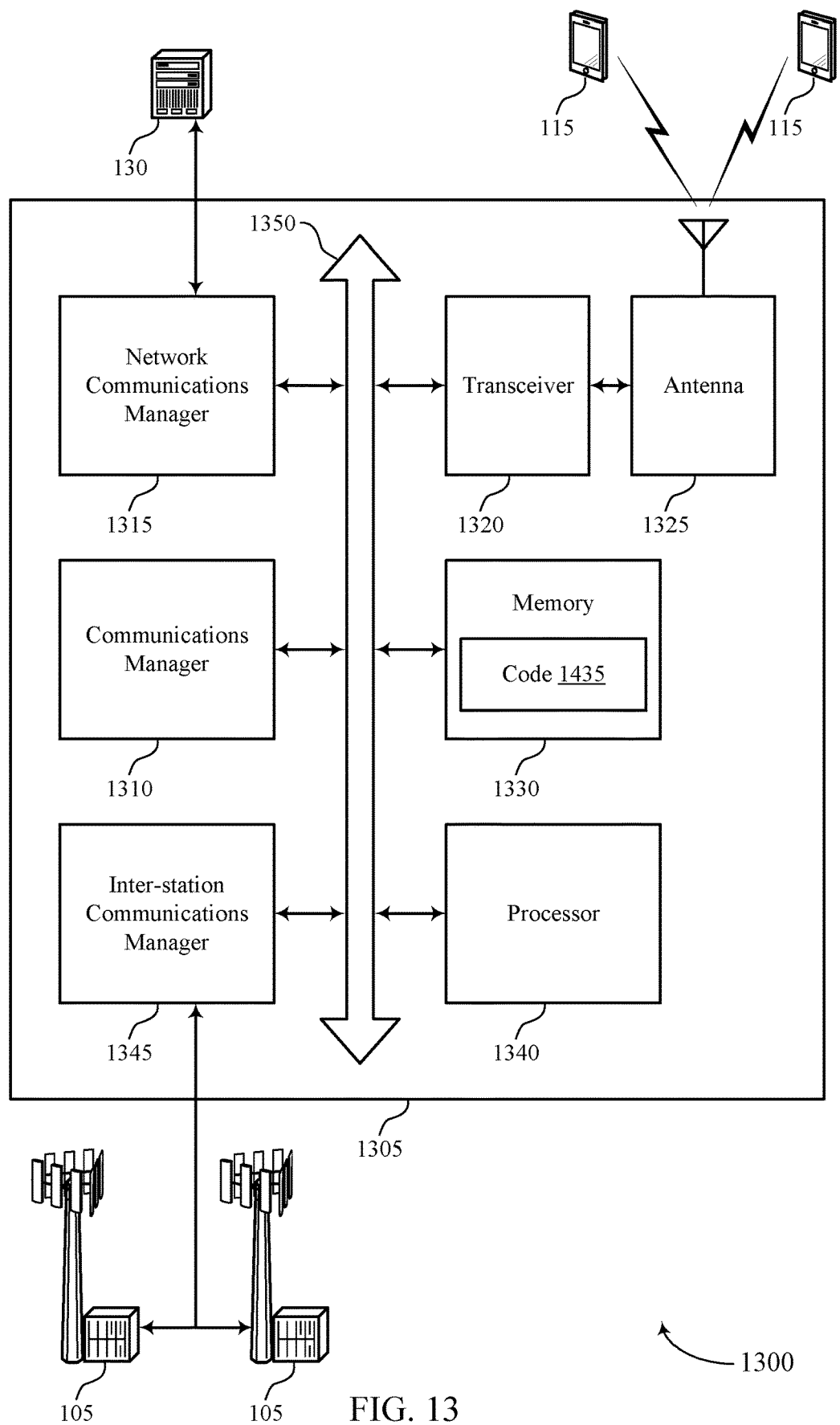
FIG. 13 shows a diagram of a system including a device that supports communicating across a wideband using sub-bands in accordance with aspects of the present disclosure.

FIG. 13 shows a diagram of a system 1300 including a device 1305 that supports communicating across a wideband using sub-bands in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a carrier bandwidth for communicating a wideband communication with a UE, transmit, to the UE, a configuration for communicating with the base station in the carrier bandwidth using a plurality of sub-band based communications that are over a plurality of sub-bands spanning the carrier bandwidth, and communicate with the UE in the carrier bandwidth using one or more of the set of sub-bands in accordance with the configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting communicating across a wideband using sub-bands).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
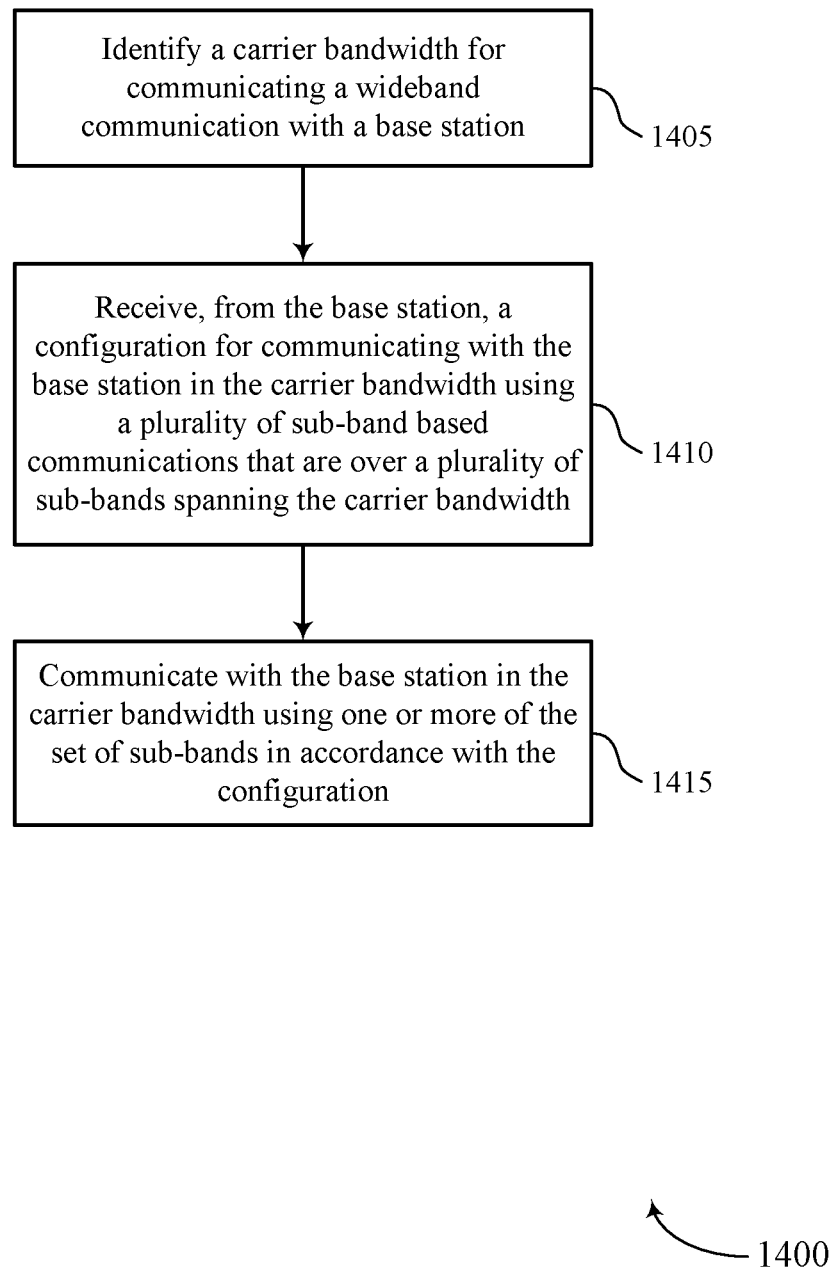
FIGS. 14 through 17 show flowcharts illustrating methods that support communicating across a wideband using sub-bands in accordance with aspects of the present disclosure.

FIG. 14 shows a flowchart illustrating a method 1400 that supports communicating across a wideband using sub-bands in accordance with aspects of the present disclosure. The operations of method 1400 may be implemented by a UE 115 or its components as described herein. For example, the operations of method 1400 may be performed by a UE Coding Manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a carrier bandwidth for communicating a wideband communication with a base station. The operations of 1405 may be performed according to the methods described herein. In some examples, aspects of the operations of 1405 may be performed by a UE capability manager as described with reference to FIGS. 6 through 9.

At 1410, the UE may receive, from the base station, a configuration for communicating with the base station in the carrier bandwidth using a set of sub-band based communications that are over a set of sub-bands spanning the carrier bandwidth. The operations of 1410 may be performed according to the methods described herein. In some examples, aspects of the operations of 1410 may be performed by a configuration component as described with reference to FIGS. 6 through 9.

At 1415, the UE may communicate with the base station in the carrier bandwidth using one or more of the set of sub-bands in accordance with the configuration. The operations of 1415 may be performed according to the methods described herein. In some examples, aspects of the operations of 1415 may be performed by a communication manager as described with reference to FIGS. 6 through 9.

Figure 15:
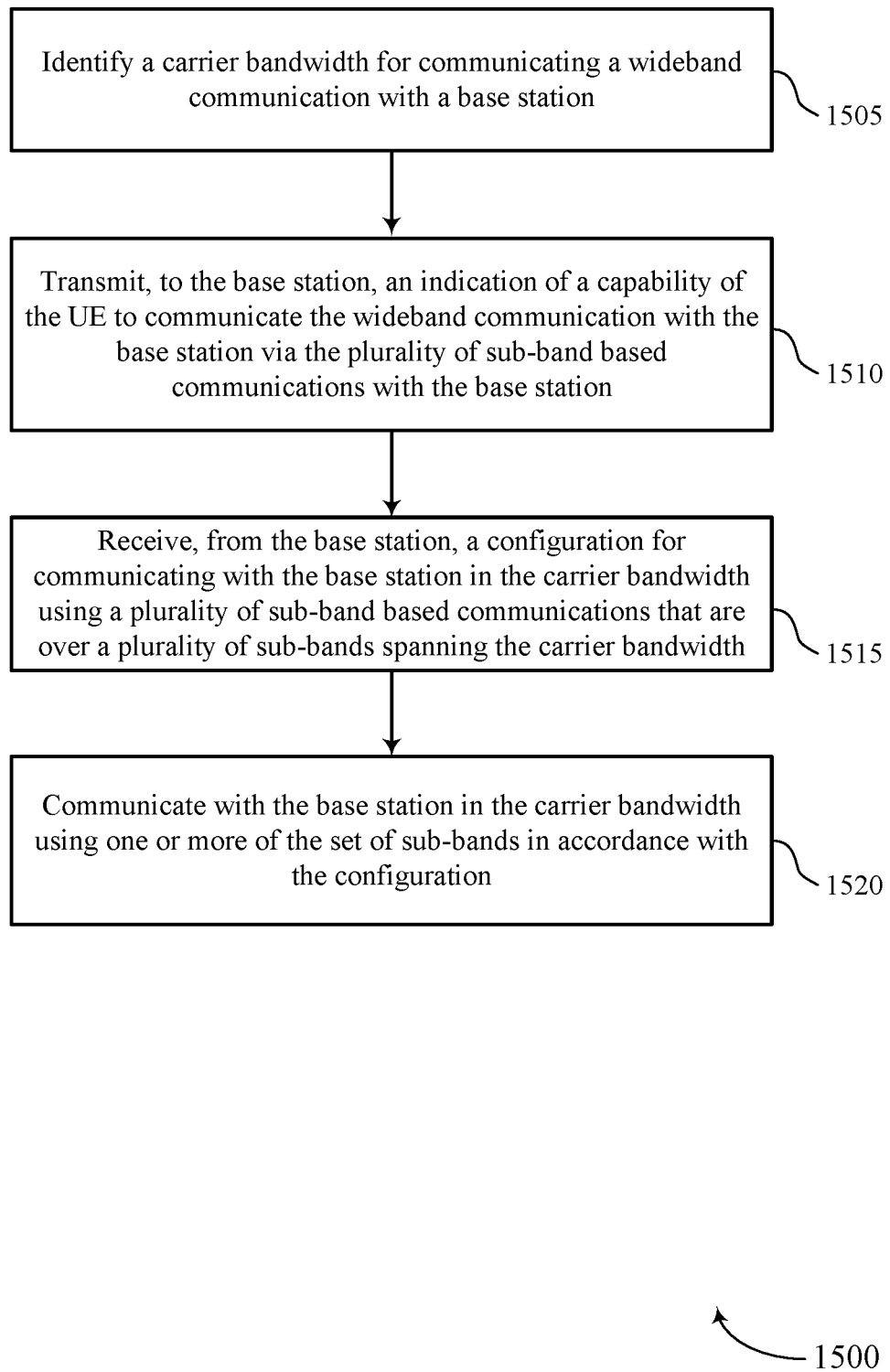

FIG. 15 shows a flowchart illustrating a method 1500 that supports communicating across a wideband using sub-bands in accordance with aspects of the present disclosure. The operations of method 1500 may be implemented by a UE 115 or its components as described herein. For example, the operations of method 1500 may be performed by a UE Coding Manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a carrier bandwidth for communicating a wideband communication with a base station. The operations of 1505 may be performed according to the methods described herein. In some examples, aspects of the operations of 1505 may be performed by an UE capability manager as described with reference to FIGS. 6 through 9.

At 1510, the UE may transmit, to the base station, an indication of a capability of the UE to communicate the wideband communication with the base station via a plurality of sub-band based communications with the base station. The operations of 1510 may be performed according to the methods described herein. In some examples, aspects of the operations of 1510 may be performed by a UE capability manager as described with reference to FIGS. 6 through 9.

At 1515, the UE may receive, from the base station and based on the capability of the UE, a configuration for communicating with the base station in the carrier bandwidth using a plurality of sub-band based communications that are over a plurality of sub-bands spanning the carrier bandwidth. The operations of 1515 may be performed according to the methods described herein. In some examples, aspects of the operations of 1515 may be performed by a configuration component as described with reference to FIGS. 6 through 9.

At 1520, the UE may communicate with the base station in the carrier bandwidth using one or more of the set of sub-bands in accordance with the configuration. The operations of 1520 may be performed according to the methods described herein. In some examples, aspects of the operations of 1520 may be performed by a communication manager as described with reference to FIGS. 6 through 9.

Figure 16:
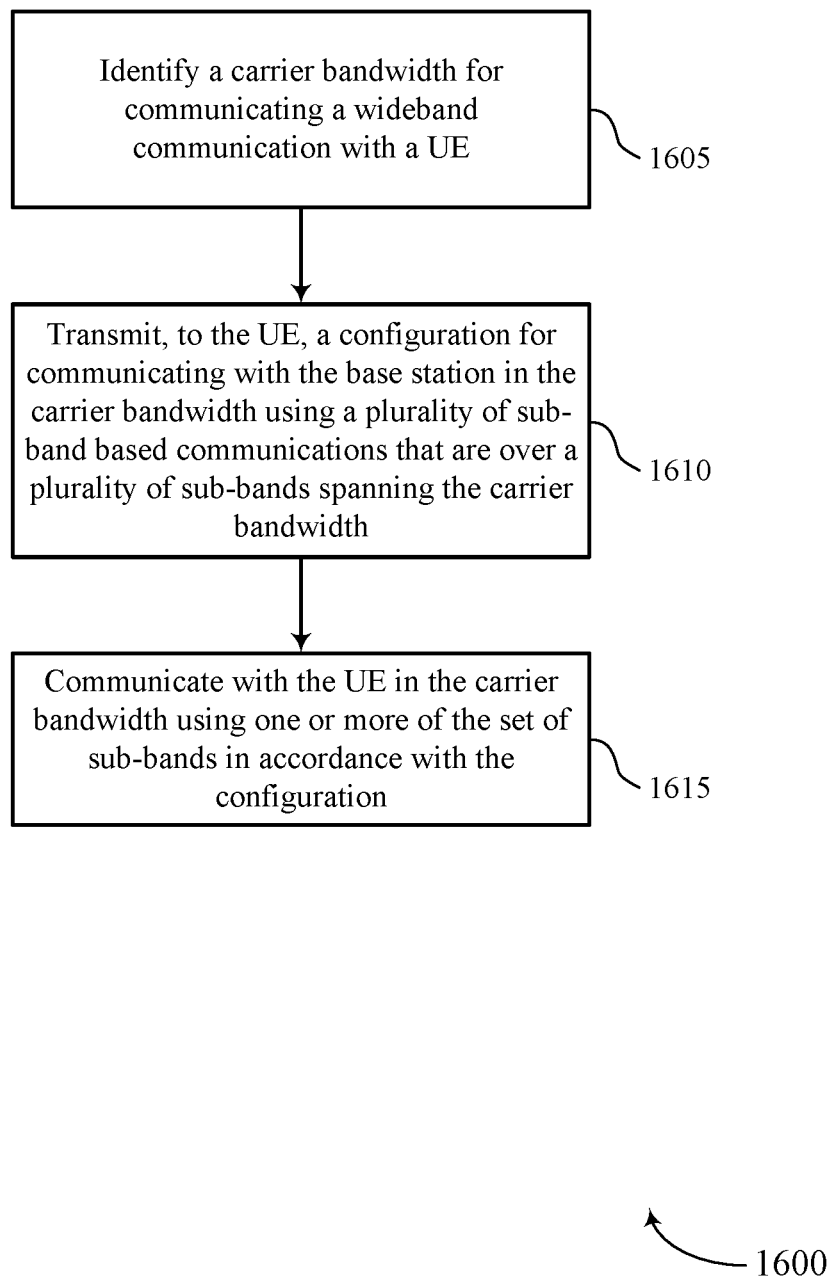

FIG. 16 shows a flowchart illustrating a method 1600 that supports communicating across a wideband using sub-bands in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify a carrier bandwidth for communicating a wideband communication with a UE. The operations of 1605 may be performed according to the methods described herein. In some examples, aspects of the operations of 1605 may be performed by a UE capability indication component as described with reference to FIGS. 10 through 13.

At 1610, the base station may transmit, to the UE, a configuration for communicating with the base station in the carrier bandwidth using a plurality of sub-band based communications that are over a plurality of sub-bands spanning the carrier bandwidth. The operations of 1610 may be performed according to the methods described herein. In some examples, aspects of the operations of 1610 may be performed by a configuration manager as described with reference to FIGS. 10 through 13.

At 1615, the base station may communicate with the UE in the carrier bandwidth using one or more of the set of sub-bands in accordance with the configuration. The operations of 1615 may be performed according to the methods described herein. In some examples, aspects of the operations of 1615 may be performed by a carrier communication manager as described with reference to FIGS. 10 through 13.

Figure 17:
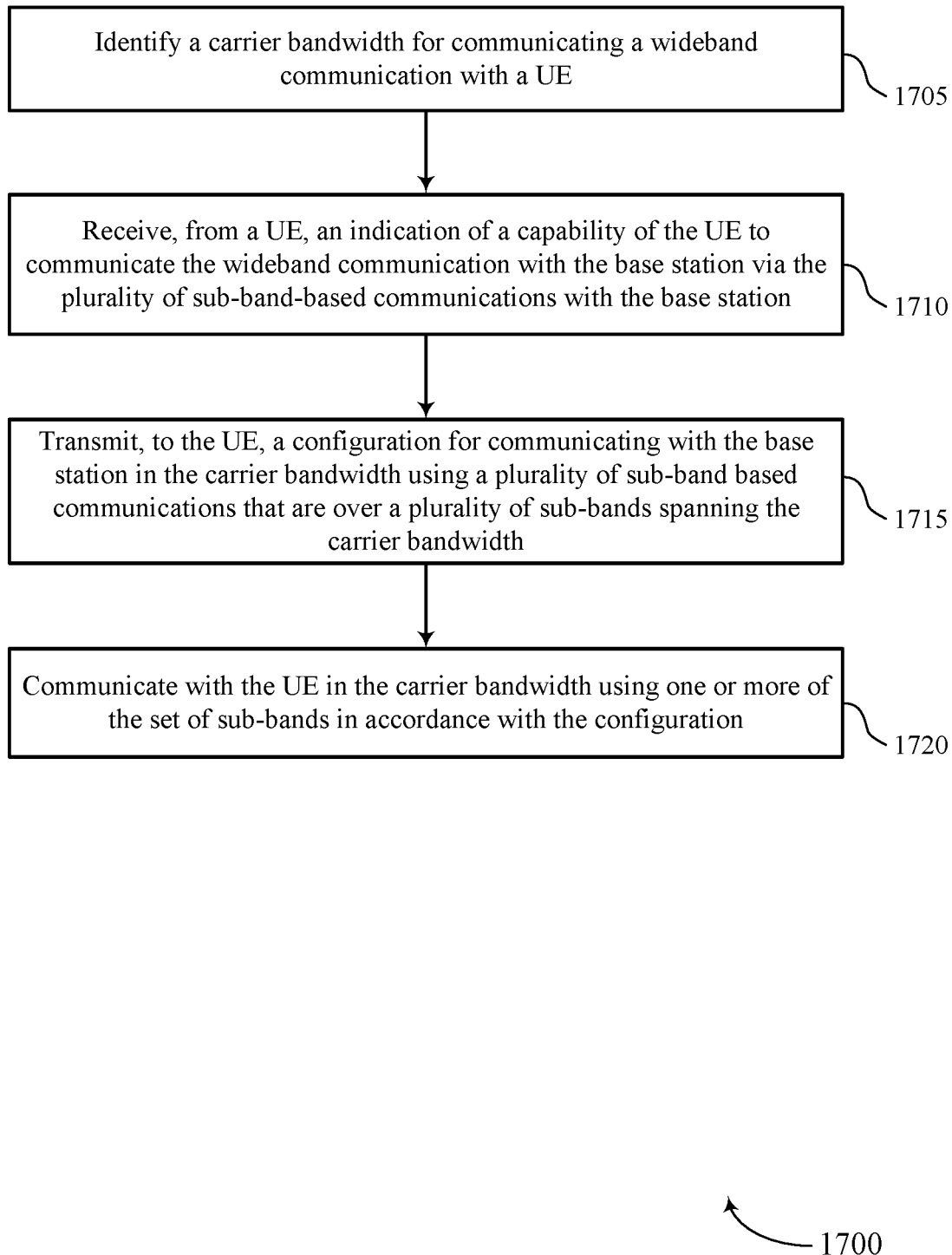

FIG. 17 shows a flowchart illustrating a method 1700 that supports communicating across a wideband using sub-bands in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify a carrier bandwidth for communicating a wideband communication with a UE. The operations of 1705 may be performed according to the methods described herein. In some examples, aspects of the operations of 1705 may be performed by a UE capability indication component as described with reference to FIGS. 10 through 13.

At 1710, the base station may receive, from the UE, an indication of a capability of the UE to communicate the wideband communication with the base station via a plurality of sub-band-based communications with the base station. The operations of 1710 may be performed according to the methods described herein. In some examples, aspects of the operations of 1710 may be performed by a UE capability manager as described with reference to FIGS. 10 through 13.

At 1715, the base station may transmit, to the UE and based on the capability of the UE, a configuration for communicating with the base station in the carrier bandwidth using a plurality of sub-band based communications that are over a plurality of sub-bands spanning the carrier bandwidth. The operations of 1715 may be performed according to the methods described herein. In some examples, aspects of the operations of 1715 may be performed by a configuration manager as described with reference to FIGS. 10 through 13.

At 1720, the base station may communicate with the UE in the carrier bandwidth using one or more of the set of sub-bands in accordance with the configuration. The operations of 1720 may be performed according to the methods described herein. In some examples, aspects of the operations of 1720 may be performed by a carrier communication manager as described with reference to FIGS. 10 through 13.

The following provides an overview of aspects of the present disclosure:

Aspect 1: A method for wireless communication at a UE, comprising: identifying a carrier bandwidth for communicating a wideband communication with a base station; receiving, from the base station, a configuration for communicating with the base station in the carrier bandwidth using a plurality of sub-band based communications that are over a plurality of sub-bands spanning the carrier bandwidth; and communicating with the base station in the carrier bandwidth using one or more of the plurality of sub-bands in accordance with the configuration.

Aspect 2: The method of aspect 1, further comprising: transmitting, to the base station, an indication of a capability of the UE to communicate the wideband communication with the base station via the plurality of sub-band based communications with the base station.

Aspect 3: The method of aspect 2, wherein transmitting the indication of the capability of the UE comprises: transmitting an indication of an antenna configuration of the UE, the antenna configuration associated with an element spacing of an antenna of the UE, a set of phases utilized by the antenna, one or more delay elements of the antenna, or a combination thereof.

Aspect 4: The method of any of aspects 2 through 3, wherein transmitting the indication of the capability of the UE comprises: transmitting an indication of a subset of the plurality of sub-bands, the subset of the plurality of sub-bands representing a first UE preference for sub-bands to be used in communicating with the base station, the subset of the plurality of sub-bands being based at least in part on at least one of a center frequency of a frequency range used by the UE or an element spacing associated with an antenna of the UE.

Aspect 5: The method of any of aspects 2 through 4, wherein transmitting the indication of the capability of the UE comprises: transmitting an indication of one or more frequencies associated with an antenna of the UE, transmitting an indication of one or more bandwidths associated with the antenna of the UE, or both.

Aspect 6: The method of any of aspects 1 through 5, wherein the configuration for communicating with the base station in the carrier bandwidth is based at least in part on an intersection of a first subset of the plurality of sub-bands associated with an antenna of the UE and a second subset of the plurality of sub-bands associated with an antenna of the base station.

Aspect 7: The method of any of aspects 1 through 6, further comprising: receiving, from the base station, an indication of an antenna configuration of the base station, the antenna configuration associated with one or more of an element spacing of an antenna of the base station, a set of phases utilized by the antenna, or one or more delay elements of the antenna, wherein receiving the configuration for communicating with the base station in the carrier bandwidth is based at least in part on receiving the indication of the antenna configuration of the base station.

Aspect 8: The method of any of aspects 1 through 7, further comprising: identifying, based at least in part on receiving the configuration, a set of frequency resources within the carrier bandwidth between a first sub-band of the plurality of sub-bands and a second sub-band of the plurality of sub-bands; and refraining from transmitting or receiving communications with the base station by the set of frequency resources based at least in part on the identifying.

Aspect 9: The method of aspect 8, wherein receiving the configuration for communicating with the base station in the carrier bandwidth comprises: receiving an indication of one or more resource blocks within the carrier bandwidth associated with the set of frequency resources, wherein identifying the set of frequency resources is based at least in part on the indication of one or more resource blocks.

Aspect 10: The method of any of aspects 1 through 9, wherein communicating with the base station comprises: receiving a first reference signal by a first sub-band of the plurality of sub-bands associated with a first identifier; and receiving a second reference signal by a second sub-band of the plurality of sub-bands different from the first sub-band, the second reference signal associated with a second identifier different from the first identifier.

Aspect 11: The method of aspect 10, further comprising: performing a first channel estimation procedure for the first sub-band based at least in part on the first reference signal; and performing a second channel estimation procedure for the second sub-band based at least in part on the second reference signal.

Aspect 12: The method of any of aspects 10 through 11, further comprising: identifying a first transmission configuration indicator state and second quasi-colocation reference information associated with the first sub-band based at least in part on the first identifier; and identifying a second transmission configuration indicator state and second quasi-colocation reference information associated with the second sub-band based at least in part on the second identifier.

Aspect 13: The method of any of aspects 10 through 12, wherein the first reference signal and the second reference signal are channel state information-reference signals, sounding reference signals, tracking reference signals, phase tracking reference signals, or demodulation reference signals.

Aspect 14: The method of any of aspects 10 through 13, wherein the first reference signal and the second reference signal are each associated with a third identifier indicating the carrier bandwidth.

Aspect 15: The method of any of aspects 1 through 14, wherein communicating with the base station in the carrier bandwidth comprises: transmitting, to the base station and in accordance with the configuration, radio resource management measurements associated with a single sub-band of the plurality of sub-bands, a set of sub-bands of the plurality of sub-bands, or the plurality of sub-bands.

Aspect 16: The method of any of aspects 1 through 15, wherein communicating with the base station in the carrier bandwidth comprises: transmitting, to the base station and in accordance with the configuration, channel state information associated with a single sub-band of the plurality of sub-bands, a set of sub-bands of the plurality of sub-bands, or the plurality of sub-bands.

Aspect 17: The method of any of aspects 1 through 16, wherein communicating with the base station in the carrier bandwidth comprises: receiving, over at least one sub-band, a physical downlink control channel message scheduling one or more transmissions across a single sub-band, a subset of the plurality of sub-bands, or each of the plurality of sub-bands.

Aspect 18: The method of any of aspects 1 through 17, wherein communicating with the base station in the carrier bandwidth comprises: receiving a downlink shared channel transmission comprising a set of transport blocks, wherein each transport block is received using one sub-band of the plurality of sub-bands.

Aspect 19: The method of aspect 18, wherein each transport block of the set of transport blocks is associated with a modulation and coding scheme and rank that is based at least in part on a sub-band used to receive each transport block.

Aspect 20: The method of any of aspects 1 through 19, wherein communicating with the base station in the carrier bandwidth comprises: receiving a downlink shared channel transmission using two or more sub-bands, the downlink shared channel transmission comprising a single transport block spanning two or more sub-bands.

Aspect 21: The method of aspect 20, wherein the single transport block comprises two or more carrier block groups each associated with one of the two or more sub-bands; and each carrier block group is associated with a modulation coding scheme.

Aspect 22: The method of any of aspects 1 through 21, wherein communicating with the base station comprises: transmitting a feedback message indicating whether a decoding of a downlink message spanning more than one sub-band is successful.

Aspect 23: A method for wireless communications at a base station, comprising: identifying a carrier bandwidth for communicating a wideband communication with a UE; transmitting, to the UE, a configuration for communicating with the base station in the carrier bandwidth using a plurality of sub-band based communications that are over a plurality of sub-bands spanning the carrier bandwidth; and communicating with the UE in the carrier bandwidth using one or more of the plurality of sub-bands in accordance with the configuration.

Aspect 24: The method of aspect 23, further comprising: receiving, from the UE, an indication of a capability of the UE to communicate the wideband communication with the base station via the plurality of sub-band-based communications with the base station.

Aspect 25: The method of aspect 24, wherein receiving the indication of the capability of the UE comprises: receiving an indication of an antenna configuration of the UE, the antenna configuration associated with an element spacing of an antenna of the UE, a set of phases utilized by the antenna, one or more delay elements of the antenna, or a combination thereof.

Aspect 26: The method of any of aspects 24 through 25, wherein receiving the indication of the capability of the UE comprises: receiving an indication of a subset of the plurality of sub-bands, the subset of the plurality of sub-bands representing a first UE preference for sub-bands to be used in communicating with the base station, the subset of the plurality of sub-bands being based at least in part on one of a center frequency of a frequency range used by the UE or an element spacing associated with an antenna of the UE.

Aspect 27: The method of any of aspects 24 through 26, wherein receiving the indication of the capability of the UE comprises: receiving an indication of one or more frequencies associated with an antenna of the UE, transmitting an indication of one or more bandwidths associated with the antenna of the UE, or both.

Aspect 28: The method of any of aspects 23 through 27, wherein the configuration for communicating with the base station in the carrier bandwidth is based at least in part on an intersection of a first subset of the plurality of sub-bands associated with an antenna of the UE and a second subset of the plurality of sub-bands associated with an antenna of the base station.

Aspect 29: The method of any of aspects 23 through 28, further comprising: transmitting, to the UE, an indication of an antenna configuration of the base station, the antenna configuration associated with one or more of an element spacing of an antenna of the base station, a set of phases utilized by the antenna, or one or more delay elements of the antenna, wherein receiving the configuration for communicating with the base station in the carrier bandwidth is based at least in part on receiving the indication of the antenna configuration of the base station.

Aspect 30: The method of any of aspects 23 through 29, further comprising: identifying, based at least in part on the configuration, a set of frequency resources within the carrier bandwidth between a first sub-band of the plurality of sub-bands and a second sub-band of the plurality of sub-bands; and refraining from transmitting or receiving communications with the UE by the set of frequency resources based at least in part on the identifying.

Aspect 31: The method of aspect 30, wherein transmitting the configuration for communicating with the base station in the carrier bandwidth further comprises: transmitting an indication of one or more resource blocks within the carrier bandwidth associated with the set of frequency resources, wherein identifying the set of frequency resources is based at least in part on the indication of one or more resource blocks.

Aspect 32: The method of any of aspects 23 through 31, wherein communicating with the UE further comprises: transmitting a first reference signal by a first sub-band of the plurality of sub-bands associated with a first identifier; and transmitting a second reference signal by a second sub-band of the plurality of sub-bands different from the first sub-band, the second reference signal associated with a second identifier different from the first identifier.

Aspect 33: The method of aspect 32, wherein the first reference signal and the second reference signal are channel state information-reference signals, sounding reference signals, tracking reference signals, phase tracking reference signals, or demodulation reference signals.

Aspect 34: The method of any of aspects 32 through 33, wherein the first reference signal and the second reference signal are each associated with a third identifier indicating the carrier bandwidth.

Aspect 35: The method of any of aspects 23 through 34, wherein communicating with the UE in the carrier bandwidth comprises: receiving, from the UE and in accordance with the configuration, radio resource management measurements associated with a single sub-band of the plurality of sub-bands, a set of sub-bands of the plurality of sub-bands, or the plurality of sub-bands.

Aspect 36: The method of any of aspects 23 through 35, wherein communicating with the UE in the carrier bandwidth comprises: receiving, from the UE and in accordance with the configuration, channel state information associated with a single sub-band of the plurality of sub-bands, a set of sub-bands of the plurality of sub-bands, or the plurality of sub-bands.

Aspect 37: The method of any of aspects 23 through 36, wherein communicating with the UE in the carrier bandwidth comprises: transmitting, over at least one sub-band, a physical downlink control channel message scheduling one or more transmissions across a single sub-band, a subset of the plurality of sub-bands, or each of the plurality of sub-bands.

Aspect 38: The method of any of aspects 23 through 37, wherein communicating with the UE in the carrier bandwidth comprises: transmitting a downlink shared channel transmission comprising a set of transport blocks, wherein each transport block is transmitted using one sub-band of the plurality of sub-bands.

Aspect 39: The method of aspect 38, wherein each transport block of the set of transport blocks is associated with a modulation and coding scheme and rank that is based at least in part on a sub-band used to receive each transport block.

Aspect 40: The method of any of aspects 23 through 39, wherein communicating with the UE in the carrier bandwidth comprises: transmitting a downlink shared channel transmission using two or more sub-bands, the downlink shared channel transmission comprising a single transport block spanning two or more sub-bands.

Aspect 41: The method of aspect 40, wherein the single transport block comprises two or more carrier block groups each associated with one of the two or more sub-bands; and each carrier block group is associated with a modulation coding scheme.

Aspect 42: The method of any of aspects 23 through 41, wherein communicating with the UE in the carrier bandwidth comprises: receiving a feedback message indicating whether a decoding of a downlink message spanning more than one sub-band is successful.

Aspect 43: A method for wireless communication at a UE, comprising: means for identifying a carrier bandwidth for communicating a wideband communication with a base station; means for receiving, from the base station, a configuration for communicating with the base station in the carrier bandwidth using a plurality of sub-band based communications that are over a plurality of sub-bands spanning the carrier bandwidth; and means for communicating with the base station in the carrier bandwidth using one or more of the plurality of sub-bands in accordance with the configuration.

Aspect 44: A method for wireless communications at a base station, comprising: means for identifying a carrier bandwidth for communicating a wideband communication with a UE; means for transmitting, to the UE, a configuration for communicating with the base station in the carrier bandwidth using a plurality of sub-band based communications that are over a plurality of sub-bands spanning the carrier bandwidth; and means for communicating with the UE in the carrier bandwidth using one or more of the plurality of sub-bands in accordance with the configuration.

Aspect 45: A method for wireless communication at a UE, comprising: identifying a carrier bandwidth for communicating a wideband communication with a base station; receiving, from the base station, a configuration for communicating with the base station in the carrier bandwidth using a plurality of sub-band based communications that are over a plurality of sub-bands spanning the carrier bandwidth; and communicating with the base station in the carrier bandwidth using one or more of the plurality of sub-bands in accordance with the configuration.

Aspect 46: A method for wireless communications at a base station, comprising: identifying a carrier bandwidth for communicating a wideband communication with a UE; transmitting, to the UE, a configuration for communicating with the base station in the carrier bandwidth using a plurality of sub-band based communications that are over a plurality of sub-bands spanning the carrier bandwidth; and communicating with the UE in the carrier bandwidth using one or more of the plurality of sub-bands in accordance with the configuration.

Aspect 47: An apparatus for wireless communication at a UE, comprising a processor; memory coupled with the processor; and instructions stored in the memory and executable by the processor to cause the apparatus to perform a method of any of aspects 1 through 22.

Aspect 48: An apparatus for wireless communication at a UE, comprising at least one means for performing a method of any of aspects 1 through 22.

Aspect 49: A non-transitory computer-readable medium storing code for wireless communication at a UE, the code comprising instructions executable by a processor to perform a method of any of aspects 1 through 22.

Aspect 50: An apparatus for wireless communications at a base station, comprising a processor; memory coupled with the processor; and instructions stored in the memory and executable by the processor to cause the apparatus to perform a method of any of aspects 23 through 42.

Aspect 51: An apparatus for wireless communications at a base station, comprising at least one means for performing a method of any of aspects 23 through 42.

Aspect 52: A non-transitory computer-readable medium storing code for wireless communications at a base station, the code comprising instructions executable by a processor to perform a method of any of aspects 23 through 42.

Aspect 53: An apparatus for wireless communication at a UE, comprising a processor; memory coupled with the processor; and instructions stored in the memory and executable by the processor to cause the apparatus to perform a method of any of aspects 43 through 43.

Aspect 54: An apparatus for wireless communication at a UE, comprising at least one means for performing a method of any of aspects 43 through 43.

Aspect 55: A non-transitory computer-readable medium storing code for wireless communication at a UE, the code comprising instructions executable by a processor to perform a method of any of aspects 43 through 43.

Aspect 56: An apparatus for wireless communications at a base station, comprising a processor; memory coupled with the processor; and instructions stored in the memory and executable by the processor to cause the apparatus to perform a method of any of aspects 44 through 44.

Aspect 57: An apparatus for wireless communications at a base station, comprising at least one means for performing a method of any of aspects 44 through 44.

Aspect 58: A non-transitory computer-readable medium storing code for wireless communications at a base station, the code comprising instructions executable by a processor to perform a method of any of aspects 44 through 44.

Aspect 59: An apparatus for wireless communication at a UE, comprising a processor; memory coupled with the processor; and instructions stored in the memory and executable by the processor to cause the apparatus to perform a method of any of aspects 45 through 45.

Aspect 60: An apparatus for wireless communication at a UE, comprising at least one means for performing a method of any of aspects 45 through 45.

Aspect 61: A non-transitory computer-readable medium storing code for wireless communication at a UE, the code comprising instructions executable by a processor to perform a method of any of aspects 45 through 45.

Aspect 62: An apparatus for wireless communications at a base station, comprising a processor; memory coupled with the processor; and instructions stored in the memory and executable by the processor to cause the apparatus to perform a method of any of aspects 46 through 46.

Aspect 63: An apparatus for wireless communications at a base station, comprising at least one means for performing a method of any of aspects 46 through 46.

Aspect 64: A non-transitory computer-readable medium storing code for wireless communications at a base station, the code comprising instructions executable by a processor to perform a method of any of aspects 46 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a carrier bandwidth for communicating a wideband communication with a network entity;
    transmitting control information indicative of a capability of the UE to communicate the wideband communication with the network entity over a plurality of sub-bands spanning the carrier bandwidth, wherein the control information identifies one or more of the plurality of sub-bands that the UE prefers to be used in communicating with the network entity, wherein the one or more of the plurality of sub-bands are based at least in part on at least one of a center frequency of a frequency range used by the UE or an element spacing associated with an antenna of the UE;
    receiving, from the network entity, a configuration for communicating with the network entity in the carrier bandwidth using a plurality of sub-band based communications that are over the plurality of sub-bands spanning the carrier bandwidth; and
    communicating with the network entity in the carrier bandwidth using the one or more of the plurality of sub-bands in accordance with the configuration.

2. The method of claim 1, wherein transmitting the control information indicative of the capability of the UE comprises:
    transmitting an indication of an antenna configuration of the UE, the antenna configuration associated with the element spacing of the antenna of the UE, a set of phases utilized by the antenna, one or more delay elements of the antenna, or a combination thereof.

3. The method of claim 1, wherein transmitting the control information indicative of the capability of the UE comprises:
    transmitting an indication of one or more frequencies associated with the antenna of the UE, transmitting an indication of one or more bandwidths associated with the antenna of the UE, or both.

4. The method of claim 1, wherein the configuration for communicating with the network entity in the carrier bandwidth is based at least in part on an intersection of a first subset of the plurality of sub-bands associated with the antenna of the UE and a second subset of the plurality of sub-bands associated with an antenna of the network entity.

5. The method of claim 1, further comprising:
    receiving, from the network entity, an indication of an antenna configuration of the network entity, the antenna configuration associated with one or more of an element spacing of an antenna of the network entity, a set of phases utilized by the antenna of the network entity, or one or more delay elements of the antenna of the network entity, wherein receiving the configuration for communicating with the network entity in the carrier bandwidth is based at least in part on receiving the indication of the antenna configuration of the network entity.

6. The method of claim 1, further comprising:
    identifying, based at least in part on receiving the configuration, a set of frequency resources within the carrier bandwidth between a first sub-band of the plurality of sub-bands and a second sub-band of the plurality of sub-bands; and refraining from transmitting or receiving communications with the network entity by the set of frequency resources based at least in part on the identifying the set of frequency resources.

7. The method of claim 6, wherein receiving the configuration for communicating with the network entity in the carrier bandwidth comprises:
receiving an indication of one or more resource blocks within the carrier bandwidth associated with the set of frequency resources, wherein identifying the set of frequency resources is based at least in part on the indication of the one or more resource blocks.

8. The method of claim 1, wherein communicating with the network entity comprises:
receiving a first reference signal by a first sub-band of the plurality of sub-bands associated with a first identifier; and
receiving a second reference signal by a second sub-band of the plurality of sub-bands different from the first sub-band, the second reference signal associated with a second identifier different from the first identifier.

9. The method of claim 8, further comprising:
performing a first channel estimation procedure for the first sub-band based at least in part on the first reference signal; and
performing a second channel estimation procedure for the second sub-band based at least in part on the second reference signal.

10. The method of claim 8, further comprising:
identifying a first transmission configuration indicator state and first quasi-colocation reference information associated with the first sub-band based at least in part on the first identifier; and
identifying a second transmission configuration indicator state and second quasi-colocation reference information associated with the second sub-band based at least in part on the second identifier.

11. The method of claim 8, wherein the first reference signal and the second reference signal are channel state information-reference signals, sounding reference signals, tracking reference signals, phase tracking reference signals, or demodulation reference signals.

12. The method of claim 8, wherein the first reference signal and the second reference signal are each associated with a third identifier indicating the carrier bandwidth.

13. The method of claim 1, wherein communicating with the network entity in the carrier bandwidth comprises:
transmitting, to the network entity and in accordance with the configuration, radio resource management measurements associated with a single sub-band of the plurality of sub-bands, a set of sub-bands of the plurality of sub-bands, or the plurality of sub-bands.

14. The method of claim 1, wherein communicating with the network entity in the carrier bandwidth comprises:
transmitting, to the network entity and in accordance with the configuration, channel state information associated with a single sub-band of the plurality of sub-bands, a set of sub-bands of the plurality of sub-bands, or the plurality of sub-bands.

15. The method of claim 1, wherein communicating with the network entity in the carrier bandwidth comprises:
receiving, over at least one sub-band, a physical downlink control channel message scheduling one or more transmissions across a single sub-band, a subset of the plurality of sub-bands, or each of the plurality of sub-bands.

16. The method of claim 1, wherein communicating with the network entity in the carrier bandwidth comprises:
receiving a downlink shared channel transmission comprising a set of transport blocks, wherein each transport block is received using a sub-band of the plurality of sub-bands.

17. The method of claim 16, wherein each transport block of the set of transport blocks is associated with a modulation and coding scheme and rank that is based at least in part on the sub-band used to receive each transport block.

18. The method of claim 1, wherein communicating with the network entity in the carrier bandwidth comprises:
receiving a downlink shared channel transmission using two or more sub-bands, the downlink shared channel transmission comprising a single transport block spanning the two or more sub-bands.

19. The method of claim 18, wherein:
the single transport block comprises two or more carrier block groups each associated with one of the two or more sub-bands; and
each carrier block group is associated with a modulation coding scheme.

20. The method of claim 1, wherein communicating with the network entity comprises:
transmitting a feedback message indicating whether a decoding of a downlink message spanning more than one sub-band is successful.

21. A method for wireless communications at a network entity, comprising:
identifying a carrier bandwidth for communicating a wideband communication with a user equipment (UE);
receiving control information indicative of a capability of the UE to communicate the wideband communication with the network entity over a plurality of sub-bands spanning the carrier bandwidth, wherein the control information identifies one or more of the plurality of sub-bands that the UE prefers to be used in communicating with the network entity, wherein the one or more of the plurality of sub-bands are based at least in part on at least one of a center frequency of a frequency range used by the UE or an element spacing associated with an antenna of the UE;
transmitting, to the UE, a configuration for communicating with the network entity in the carrier bandwidth using a plurality of sub-band based communications that are over the plurality of sub-bands spanning the carrier bandwidth; and
communicating with the UE in the carrier bandwidth using the one or more of the plurality of sub-bands in accordance with the configuration.

22. The method of claim 21, wherein receiving the control information indicative of the capability of the UE comprises:
receiving an indication of an antenna configuration of the UE, the antenna configuration associated with the element spacing of the antenna of the UE, a set of phases utilized by the antenna, one or more delay elements of the antenna, or a combination thereof.

23. The method of claim 21, wherein receiving the indication control information indicative of the capability of the UE comprises:
receiving an indication of one or more frequencies associated with the antenna of the UE, transmitting an indication of one or more bandwidths associated with the antenna of the UE, or both.

24. The method of claim 21, wherein the configuration for communicating with the network entity in the carrier bandwidth is based at least in part on an intersection of a first subset of the plurality of sub-bands associated with the antenna of the UE and a second subset of the plurality of sub-bands associated with an antenna of the network entity.

25. An apparatus for wireless communication at a user equipment (UE), comprising:
a processor,
memory coupled with the processor; and
instructions stored in the memory and executable by the processor to cause the apparatus to:
identify a carrier bandwidth for communicating a wideband communication with a network entity;
transmit control information indicative of a capability of the UE to communicate the wideband communication with the network entity over a plurality of sub-bands spanning the carrier bandwidth, wherein the control information identifies one or more of the plurality of sub-bands that the UE prefers to be used in communicating with the network entity, wherein the one or more of the plurality of sub-bands are based at least in part on at least one of a center frequency of a frequency range used by the UE or an element spacing associated with an antenna of the UE;
receive, from the network entity, a configuration for communicating with the network entity in the carrier bandwidth using a plurality of sub-band based communications that are over the plurality of sub-bands spanning the carrier bandwidth; and
communicating with the network entity in the carrier bandwidth using the one or more of the plurality of sub-bands in accordance with the configuration.

26. An apparatus for wireless communications at a network entity, comprising:
a processor,
memory coupled with the processor; and
instructions stored in the memory and executable by the processor to cause the apparatus to:
identify a carrier bandwidth for communicating a wideband communication with a user equipment (UE);
receive control information indicative of a capability of the UE to communicate the wideband communication with the network entity over a plurality of sub-bands spanning the carrier bandwidth, wherein the control information identifies one or more of the plurality of sub-bands that the UE prefers to be used in communicating with the network entity, wherein the one or more of the plurality of sub-bands are based at least in part on at least one of a center frequency of a frequency range used by the UE or an element spacing associated with an antenna of the UE;
transmit, to the UE, a configuration for communicating with the network entity in the carrier bandwidth using a plurality of sub-band based communications that are over the plurality of sub-bands spanning the carrier bandwidth; and
communicating with the UE in the carrier bandwidth using the one or more of the plurality of sub-bands in accordance with the configuration.

* * * * *